United States Patent
Fuchs et al.

(10) Patent No.: US 9,898,866 B2
(45) Date of Patent: Feb. 20, 2018

(54) LOW LATENCY STABILIZATION FOR HEAD-WORN DISPLAYS

(71) Applicant: The University of North Carolina at Chapel Hill, Chapel Hill, NC (US)

(72) Inventors: Henry Fuchs, Chapel Hill, NC (US); Anselmo A. Lastra, Chapel Hill, NC (US); Jan-Michael Frahm, Chapel Hill, NC (US); Nate Michael Dierk, Carrboro, NC (US); David Paul Perra, Marina Del Rey, CA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 147 days.

(21) Appl. No.: 14/776,244

(22) PCT Filed: Mar. 13, 2014

(86) PCT No.: PCT/US2014/026349
§ 371 (c)(1),
(2) Date: Sep. 14, 2015

(87) PCT Pub. No.: WO2014/160342
PCT Pub. Date: Oct. 2, 2014

(65) Prior Publication Data
US 2016/0035139 A1    Feb. 4, 2016

Related U.S. Application Data

(60) Provisional application No. 61/780,546, filed on Mar. 13, 2013.

(51) Int. Cl.
*G06T 19/00*    (2011.01)
*G06F 3/01*    (2006.01)
(Continued)

(52) U.S. Cl.
CPC .......... *G06T 19/006* (2013.01); *G01B 11/002* (2013.01); *G02B 27/0093* (2013.01);
(Continued)

(58) Field of Classification Search
None
See application file for complete search history.

(56) References Cited

U.S. PATENT DOCUMENTS 6,503,195 B1    1/2003    Keller et al.
7,453,514 B2    11/2008    Furlan et al.
(Continued)

FOREIGN PATENT DOCUMENTS

KR    10-2005-0082348    8/2005
KR    10-2009-0047889    5/2009
(Continued)

OTHER PUBLICATIONS

Hedborg et al., "Structure and Motion Estimation from Rolling Shutter Video," IEEE, 2011.*
(Continued)

*Primary Examiner* — Nicholas R Wilson
(74) *Attorney, Agent, or Firm* — Jenkins, Wilson, Taylor & Hunt, P.A.

(57) ABSTRACT

Methods, systems, and computer readable media for low latency stabilization for head-worn displays are disclosed. According to one aspect, the subject matter described herein includes a system for low latency stabilization of a head-worn display. The system includes a low latency pose tracker having one or more rolling-shutter cameras that capture a 2D image by exposing each row of a frame at a later point in time than the previous row and that output image data row by row, and a tracking module for receiving image data row by row and using that data to generate a local appearance manifold. The generated manifold is used to
(Continued)

track camera movements, which are used to produce a pose estimate.

27 Claims, 5 Drawing Sheets

(51) Int. Cl.

| | | |
|---|---|---|
| G02B 27/01 | (2006.01) | |
| G02B 27/00 | (2006.01) | |
| G01B 11/00 | (2006.01) | |
| G06K 9/52 | (2006.01) | |
| G06T 7/60 | (2017.01) | |
| H04N 5/247 | (2006.01) | |
| H04N 5/341 | (2011.01) | |
| G06T 7/73 | (2017.01) | |
| G06T 7/77 | (2017.01) | |
| G06T 7/292 | (2017.01) | |

(52) U.S. Cl.
CPC .......... *G02B 27/017* (2013.01); *G06F 3/012* (2013.01); *G06F 3/013* (2013.01); *G06K 9/52* (2013.01); *G06T 7/292* (2017.01); *G06T 7/60* (2013.01); *G06T 7/73* (2017.01); *G06T 7/77* (2017.01); *H04N 5/247* (2013.01); *H04N 5/341* (2013.01); *G02B 2027/014* (2013.01); *G02B 2027/0138* (2013.01); *G02B 2027/0178* (2013.01); *G06T 2207/30244* (2013.01)

(56) References Cited

U.S. PATENT DOCUMENTS

| | | | |
|---|---|---|---|
| 2002/0118861 A1 | 8/2002 | Jouppi et al. | |
| 2005/0083248 A1 | 4/2005 | Biocca et al. | |
| 2005/0168403 A1 | 8/2005 | Ebersole, Jr. et al. | |
| 2006/0161572 A1 | 7/2006 | Vogt et al. | |
| 2009/0213037 A1 | 8/2009 | Schon | |
| 2011/0018903 A1 | 1/2011 | Lapstun et al. | |
| 2011/0211082 A1 | 9/2011 | Forssén et al. | |
| 2012/0062702 A1 | 3/2012 | Jiang et al. | |
| 2012/0119978 A1 | 5/2012 | Border et al. | |
| 2012/0307075 A1 | 12/2012 | Margalit | |
| 2012/0320224 A1* | 12/2012 | Miyoshi ................ | H04N 5/217 348/207.1 |
| 2013/0201291 A1 | 8/2013 | Liu et al. | |
| 2015/0138069 A1 | 5/2015 | Fuchs et al. | |

FOREIGN PATENT DOCUMENTS

| | | | |
|---|---|---|---|
| WO | 2013/173728 A1 | 11/2013 | |
| WO | WO 2004/012141 A1 | 11/2013 | |
| WO | WO 2016/073557 A1 | 5/2016 | |

OTHER PUBLICATIONS

Non-Final Office Action for U.S. Appl. No. 14/401,833, filed Dec. 14, 2015.
Notification of Transmittal of the International Search Report and the Written Opinion of the International Searching Authority, or the Declaration for International Application No. PCT/US2013/041614 (Aug. 27, 2013).
Pollefeys et al., "Visual modeling with a hand-held camera," International Journal of Computer Vision, vol. 59, No. 3, pp. 207-232 (2004).
Bishop, "Self-Tracker: A Smart Optical Sensor on Silicon," Dissertation, http://www.cs.unc.edu/~gb/Pubs/SelfTracker.pdf, pp. 1-65 (1984).
Maimone et al., "General-purpose telepresence with head-worn optical see-through displays and projector-based lighting," To appear in: IEEE Virtual Reality 2013, (Mar. 2013).
Pool et al., "Lossless compression of variable-precision floating-point buffers on GPUs," Proc. Symposium on interactive 3D Graphics (I3D), (Mar. 9-11, 2012).
Jerald et al., "Scene-motion thresholds during head yaw for immersive virtual ebvironments," ACM Transactions on Applied Perception (TAP), vol. 9, No. 1 p. 4, (2012).
Maimone et al., "A first look at a telepresence system with room-sized real-time 3d capture and life-sized tracked display wall," 2011 21st International Conference on Artificial Reality and Telexistence (ICAT), (Nov. 2011).
Maimone et al., "Encumbrance-free telepresence system with real-time 3d capture and displays using commodity depth cameras," 2011 10th IEEE International Symposium on Mixed and Augmented Reality (ISMAR), (Oct. 2011).
Pool et al., "Precision selection for energy-efficient pixel shaders," Proc. High Performance Graphics, ACM, (Aug. 5-7, 2011).
Pool et al., "Power-gated arithmetic circuits for energy-precision tradeoffs in mobile graphics processing units," Journal of Low-Power Electronics (JOLPE), vol. 7, No. 2, pp. 148-162, (2011).
Ye et al., "A Practical Multi-Viewer Tabletop Autostereoscopic Display," 2010 9th IEEE International Symposium on Mixed and Augmented Reality (ISMAR), pp. 147-156, (Oct. 2010).
Pool et al., "An energy model for graphics processing units," 2010 IEEE International Conference on Computer Design (ICCD), pp. 409-416, (Oct. 2010).
Newcombe et al., "Live dense reconstruction with a single moving camera," 2010 IEEE Conference on Computer Vision and Pattern Recognition (CVPR), pp. 1498-1505, IEEE, (2010).
Clipp et al., "Parallel, real-time visual slam," 2010 IEEE/RSJ International Conference on Intelligent Robots and Systems (IROS), pp. 3961-3968. IEEE, (2010).
Asteriadis et al., "Head pose estimation with one camera, in uncalibrated environments," Proceedings of the 2010 workshop on Eye gaze in intelligent human machine interaction, EGIHMI '10, pp. 55-62, New York, NY, USA (2010).
Parker et al., "Optix: A general purpose ray racing engine," ACM Transactions on Graphics, (Aug. 2010).
Baker et al., "Removing rolling shutter wobble," Computer Vision and Pattern Recognition (CVPR), 2010 IEEE Conference, pp. 2392-2399, (Jun. 2010).
Forsse et al., "Rectifying rolling shutter video from hand-held devices," 2010 IEEE Conference on Computer Vision and Pattern Recognition (CVPR), pp. 507-514, (Jun. 2010).
Jinwei Gu et al., "Coded rolling shutter photography: Flexible space-time sampling," 2010 IEEE International Conference on Computational Photography (ICCP), pp. 1-8, (Mar. 2010).
Lincoln et al., "Multi-view lenticular display for group teleconferencing," Proceedings of the 2nd International Conference on immersive Telecommunications, IMMERSCOM '09, pp. 22:1-22:8, ICST, Brussels, Belgium, Belgium, Institute for Computer Sciences, Social-Informatics and Telecommunications Engineering, (2009).
Lincoln et al., "Animatronic shader lamps avatars," Proceedings of the 2009 8th IEEE International Symposium on Mixed and Augmented Reality, ISMAR '09, pp. 27-33, Washington, DC, USA, IEEE Computer Society, (2009).
Nashel et al., "Random hole display: A non-uniform barrier autostereoscopic display," 3DTV Conference: The True Vision—Capture, Trandmission and Display of 3D Video, 2009, pp. 1-4, (May 2009).
Jerald et al., "Sensitivity to scene motion for phases of head yaws," Proceedings of the 5th symposium om Applied perception in graphics and visualization, pp. 155-162, ACM, (2008).
Pool et al., "Energy-precision tradeoffs in mobile graphics processing units," Proc. Int. Conf. Computer Design (ICCD), p. 6067, (2008).
Steinhurst et al., "Reducing Photon Mapping Bandwidth by Query Reordering," IEEE Transactions on Visualization and Computer Graphics, vol. 14, No. 1, pp. 13-24, (2008).
Raguram et al., "A comparative analysis of RANSAC techniques leading to adaptive real-time random sample consensus," Computer Vision—ECCV 2008, pp. 500-513, (2008).

(56) References Cited

OTHER PUBLICATIONS

Pollefeys et al., "Detailed real-time urban 3d reconstruction from video," International Journal of Computer Vision, vol. 78, No. 2, pp. 143-167, (2008).
Coombe, "Practical Surface Light Fields," Phd Dissertation, (2007).
Davison et al., "Monoslam: Real-time single camera slam," IEEE Transactions on Pattern Analysis and Machine Intelligence, vol. 29, No. 6, pp. 1052-1067, (2007).
Yang et al., "Differential Camera Tracking Through Linearizing the Local Appearance Manifold," IEEE Conference on Computer Vision and Pattern Recognition (CVPR'07), pp. 1-8, IEEE, (2007).
Steinhurst et al., "Practical Photon Mapping in Hardware," Phd Dissertation, (2007).
Hensley et al., "Increasing Rendering Performance of Graphics Hardware," PhD dissertation, (2007).
Horn et al., "Interactive k-d tree GPU raytracing," Proceedings of the 2007 symposium on Interactive 3D graphics and games, I3D '07, pp. 167-174, New York, NY, USA, ACM, (2007).
Coombe et al., "An incremental weighted least squares approach to surface lights fields," GRAPP International Conference on Computer Graphics Theory and Applications, pp. 84-91, (2006).
Steinhurst et al., "Global Importance Sampling of Glossy Surfaces Using the Photon Map," IEEE Symposium on Interactive Ray Tracing, (2006).
State et al., "Simulation-Based Design and Rapid Prototyping of a Parallax-Free, Orthoscopic Video See-Through Head-Mounted Display," Proceedings of the Fourth IEEE and ACM International Symposium on Mixed and Augmented Reality, pp. 28-31, (Oct. 2005).
Steinhurst et al., "Reordering for Cache Conscious Photon Mapping," Proceedings of Graphics Interface, (2005).
Elgammal, "Learning to track: Conceptual manifold map for closed-form tracking," Proceedings of the 2005 IEEE Computer Society Conference on Computer Vision and Pattern Recognition (CVPR'05), vol. 1, CVPR '05, pp. 724-730, Washington, DC, USA, IEEE Computer Society, (2005).
Coombe et al., "Online construction of surface light fields," EGSR, (2005).
Hensley et al., "Fast summed-area table generation and its applications," Proceedings of Eurographics 2005 and Computer Graphics Forum, (2005).
Hensley et al., "A fast, energy-efficient z-comparator," Proceedings of Graphics Hardware, pp. 41-44, 2005.
Hensley et al., "A scalable counterflow-pipelined asynchronous radix-4 nooth multiplier," Proceedings of the 11th IEEE International Symposium on Computer Design, IEEE Computer Society, (2005).
Nakamura, "Image Sensors and Signal Processing for Digital Still Cameras," CRC Press, Inc., Boca Raton, FL, USA, (2005).
Muehlmann et al., "A new high speed CMOS camera for real-time tracking applications," Proceedings of the 2004 IEEE International Conference on Robotics and Automation (ICRA '04), vol. 5, pp. 5195-5200, (Apr.-May 1, 2004).
Coombe et al., "Radiosity on graphics hardware," Proceedings of Graphics Interface, (2004).
Hensley et al., "An area- and energy-efficient asynchronous booth multiplier for mobile devices," Proc. Int. Conf. Computer Design (ICCD), pp. 18-25, (2004).
Kelshikar et al., "Real-time Terascale Implementation of Tele-immersion,"Computational Science—ICCS 2003, vol. 2660, pp. 33-42 (Jun. 2003).
Adelstein et al., "Head tracking latency in virtual environments: psychophysics and a model," Proceedings of the Human Factors and Ergonomics Society Annual Meeting, vol. 47, pp. 2083-2087, SAGE Publications. (2003).
Davison, "Real-time simultaneous localisation and mapping with a single camera," Proceedings of the Ninth IEEE International Conference on Computer Vision, pp. 1403-1410, IEEE, (2003).
Harris, "Real-Time Cloud Simulation and Rendering," PhD Dissertation (available as technical report #tr03-040), (2003).
Harris et al., "Simulation of cloud dynamics on graphics hardware," Proceedings of Graphics Hardware, (2003).
Harris et al., "Physically-based visual simulation on graphics hardware," SIGGRAPH / Eurographics Workshop on Graphics Hardware, (2002).
Comaniciu et al., "Mean shift: A robust approach towards feature space analysis," IEEE Trans. Pattern Anal. Mach. Intell., vol. 24, No. 5, pp. 603-619, (May 2002).
Ellis et al., "Three dimensional tracking in augmented environments: user performance trade-offs between system latency and update rate," Proceedings of the Human Factors and Ergonomics Society annual meeting, vol. 46, pp. 2149-2153, SAGE Publications, (2002).
Rolland et al., "Optical versus video see-through head-mounted displays," Medical Visualization, Presence: Teleoperators and Virtual Environments, pp. 287-309, (2000).
Gabbard et al., "User-centered design and evaluation of virtual environments," Computer Graphics and Applications, IEEE, vol. 19, No. 6, pp. 51-59, (1999).
Pollefeys et al., "Self-calibration and metric reconstruction inspite of varying and unknown intrinsic camera parameters," International Journal of Computer Vision, vol. 32, No. 1, pp. 7-25, (1999).
Belhumeur et al., "What is the set of images of an object under all possible illumination conditions?," Int. J. Comput. Vision, vol. 28, No. 3, pp. 245-260, (Jul. 1998).
Fuchs et al., "Augmented reality visualization for laparoscopic surgery," Proceedings of the First International Conference on Medical Image Computing and Computer-Assisted Intervention, pp. 934-943, Springer-Verlag, (1998).
Hager et al., "Efficient region tracking with parametric models of geometry and illumination," IEEE Transactions on Pattern Analysis and Machine Intelligence, vol. 20, No. 10, pp. 1025-1039, (Oct. 1998).
Mark et al., "Post-rendering 3d warping," Proceedings of the 1997 symposium on Interactive 3D graphics, I3D '97, pp. 7-16, New York, NY, USA, ACM (1997).
Feiner et al., "A touring machine: Prototyping 3d mobile augmented reality systems for exploring the urban environment," Proceedings of the 1st IEEE International Symposium on Wearable Computers, ISWC '97, pp. 74, Washington, DC, USA, IEEE Computer Society. (1997).
Jacobs et al., "Managing latency in complex augmented reality systems," Proceedings of the 1997 symposium on Interactive 3D graphics, I3D '97, pp. 49-ff., New York, NY, USA, ACM, (1997).
Fossum "Cmos image sensors: electronic camera on a chip," International Electron Devices Meeting, 1995, IEDM '95, pp. 17-25, (Dec. 1995).
Olano et al., "Combatting rendering latency," Proceedings of the 1995 symposium on Interactive 3D graphics, I3D '95, New York, NY, USA, ACM, (1995).
Murase et al., "Visual learning and recognition of 3-d objects from appearance," Int. J. Comput. Vision, vol. 14, No. 1, pp. 5-24, (Jan. 1995).
Kelley et al., "Hardware accelerated rendering of csg and transparency," Proceedings of the 31st annual conference on Computer graphics and interactive techniques, SIGGRAPH '94, pp. 177-184, New York, NY, USA, ACM, (1994).
Neumann et al., "A vision of telepresence for medical consultations and other applications," Proceedings of the Sixth International Symposium on Robotics Research, pp. 565-571, (Oct. 1993).
Feiner et al., "Knowledge-based augmented reality," Commun. ACM, vol. 36, No. 7, pp. 53-62, (Jul. 1993).
Heeger et al., "Subspace methods for recovering rigid motion i: Algorithm and implementation," International Journal of Computer Vision, vol. 7, pp. 95-117, (1992).
Caudell et al., "Augmented reality: an application of heads-up display technology to manual manufacturing processes," Proceedings of the Twenty-Fifth Hawaii International Conference on System Sciences, vol. 2, pp. 659-669 (Jan. 1992).
Hanna, "Direct multi-resolution estimation of ego-motion and structure from motion," Proceedings of the IEEE Workshop on Visual Motion, pp. 156-162, (Oct. 1991).

(56) References Cited

OTHER PUBLICATIONS

Deering et al., "The triangle processor and normal vector shader: a VLSI system for high performance graphics," Proceedings of the 15th annual conference on Computer graphics and interactive techniques, SIGGRAPH '88, pp. 21-30, New York, NY, USA, ACM, (1988).

Niimi et al., "A parallel processor system for three-dimensional color graphics," SIGGRAPH Comput. Graph., vol. 18, No. 3, pp. 67-76, (Jan. 1984).

Fischler et al., "Random sample consensus: a paradigm for model fitting with applications to image analysis and automated cartography," Commun. ACM, vol. 24, No. 6, pp. 381-395, (Jun. 1981).

Watkins, "A real time visible surface algorithm," PhD Thesis, Order No. AAI7023061, (1970).

Applicant Initiated Interview Summary for U.S. Appl. No. 14/401,833 dated Mar. 17, 2016.

Notification of Transmittal of the International Search Report and the Written Opinion of the International Searching Authority, or the Declaration for International Application No. PCT/US2014/026349 (dated Jul. 28, 2014).

DLP Discovery 4100 Development Kit, http://www.ti.com/tool/dlpd4x00kit, pp. 1-4 (Jan. 2014).

Dou et al., "Scanning and Tracking Dynamic Objects with Commodity Depth Cameras," Mixed and Augmented Reality (ISMAR), 2013 IEEE International Symposium, pp. 1-8 (2013).

Final Office Action for U.S. Appl. No. 14/401,833, dated Jun. 10, 2016.

Fuchs, "Augmenting reality for medicine, training, presence, and telepresence," Proceedings IEEE International Symposium on Mixed and Augmented Reality (ISMAR 2010), 1 page, (2010).

Gu et al., "Coded Rolling Shutter Photography: Flexible Space-Time Sampling," Computational Photography (ICCP), 2010 IEEE International Conference, pp. 1-8 (Mar. 2010).

Jones et al., "Achieving Eye Contact in a One-to-Many 3D Video Teleconferencing System," ACM Transactions on Graphics, 28(3), pp. 1-8 (Jul. 2009).

Maimone et al., "Computational augmented reality eyeglasses," Mixed Augmented Reality (ISMAR), 2013 IEEE International Symposium, pp. 1-10 (2013).

Non-Final Office Action for U.S. Appl. No. 14/401,833, filed Oct. 28, 2016.

Notification of Transmittal of the International Search Report and the Written Opinion of the International Searching Authority, or the Declaration for International Application No. PCT/US2015/058959 (Mar. 3, 2016).

Pasman et al., "Accurate overlaying for mobile augmented reality," Preprint for Computers&Graphis, 23(6), pp. 875-881 (7 pages) (1999).

Final Office Action for U.S. Appl. No. 14/401,833, filed May 12, 2017.

* cited by examiner

LOW LATENCY STABILIZATION FOR HEAD-WORN DISPLAYS

PRIORITY CLAIM

This application claims the benefit of U.S. Provisional Patent Application Ser. No. 61/780,546 filed Mar. 13, 2013; the disclosure of which is incorporated herein by reference in its entirety.

TECHNICAL FIELD

The subject matter described herein relates to methods and systems for providing augmented reality devices. More particularly, the subject matter described herein relates to low latency stabilization for head-worn displays.

BACKGROUND

Augmented reality overlays computer-generated information with a user's physical environment through video integration or a transparent display. Augmented reality merges computer-generated, synthetic information with a user's view of his or her surroundings. For the past two decades, researchers have demonstrated the promise of augmented reality (AR) to allow society to reach new levels of capability and efficiency in such diverse areas as medicine [22], manufacturing [5], maintenance [18], navigation [17], and telepresence [51]. Although to date this technology has been primarily confined to the lab, new advances in mobile processors, sensors, and displays offer the potential of mainstream use of AR. In particular, optical see-through head mounted displays (HMDs), which offer augmented overlays over one's natural vision, are beginning to become practical. The bulky designs and narrow fields of view that failed in the past are being replaced with high-performance devices in comfortable and compact form factors that approach ordinary eyeglasses.

However, the usefulness of conventional augmented reality systems is hindered by the deleterious effects of system latency, which causes an image mismatch between the real and synthetic imagery. This is known as the augmented reality registration problem and has many causes including system latency, tracker error, calibration error, and optical distortion. Studies have shown that the majority of the error is caused by the total system latency, introducing more error than all other issues combined. Non-uniform latency, or jitter, is more noticeable than a constant latency. Latency in conventional augmented reality systems has been observed to incur 1 millimeter of misalignment for every 1 millisecond of latency.

In most cases, augmented imagery is merged via video or optical integration on either a handheld or head-worn display that is constantly moving with a human user. System latency introduces misalignment of the overlain imagery during display motion, as the pose estimate used to generate the image is no longer valid at the time the image is displayed.

As used herein, the term "pose" refers to the apparent position (e.g., the X, Y, and Z coordinates) and orientation (e.g., the azimuth and inclination or the pitch, roll, and yaw) of the viewer, which determines what portion of the real world the viewer sees at a given instant.

Augmented reality has seen a recent resurgence on handheld mobile devices. However, these applications thrive on their ability to mask the detrimental effects of latency. These systems hide the delay by simultaneously delaying the user's view of the real world to synchronize with the overlaid imagery. Delaying the real world is only possible with video see-through image integration where a camera captures the real world and displays it to the user along with synthetic information. This technique does not apply to optical see-through designs since they merge the computer-generated imagery (and its inevitable latency) with a user's natural view of his or her surroundings through transparency (which cannot be delayed). Delaying the real world is a viable option for handheld displays since they use video see-through, typically capturing the real world with a camera on the back of the unit. The method's delay is only viable on a handheld display because the user may not notice the delay induced difference between the image on the display and the underlying view. The delays from this method are much more noticeable on a head-worn display, often inducing simulator sickness.

Optical see-through displays offer a direct and undegraded view of the real environment that is suitable for extended use throughout one's daily activities. However, this desirable attribute comes at a cost; unlike video see-through displays, which allow synchronization of real and virtual objects in software through a combined video signal, optical see-through designs must rely on very low display latency to keep the virtual and real aligned [65]. The latency of today's AR systems, even those optimized for low latency, extends beyond a simple annoyance or distraction and renders many optical see-through applications unusable.

Unfortunately, latency occurs throughout all components of an AR system and thus is not an easy problem to fix [37]. Tracking cameras process data in whole frame intervals and apply processing to ameliorate the effects of rolling shutters. Modern graphics hardware uses deep pipelines to achieve high performance at the expense of latency, and scanout uses one or more frame buffers to prevent image tearing. Displays provide onboard image scaling and enhancement which insert additional delays. The sum of these latencies typically numbers several frames.

As computing is becoming increasingly mobile, there is also an increasing desire for mobile augmented reality. Many sought augmented reality applications are only useful if done on either a hand-held or head-worn device as they provide a custom, individualized augmentation for each user in a shared space. A mobile platform imposes severe constraints on processing, memory, and component size for all activities: tracking, rendering, and display.

There are disadvantages associated with conventional augmented reality systems. A typical augmented reality system uses readily available peripherals and renderers designed for overall performance. Cameras are typically designed to be general purpose and useful in numerous applications. The vast majority of current camera technology is not well suited for onboard pose estimation for head-mounted displays. For augmented reality applications a camera-based head tracker requires a high-frame rate to ensure frequent updates. Unfortunately, high-frame rate cameras are expensive and power hungry, and may result in a reduced signal to noise ratio. The same price and power increases are true of displays. Typical displays and some image sensor controllers use buffers, meaning that data isn't sent until an entire frame is ready. Because the data is ultimately read sequentially, the data towards the end of each frame arrives later than when it was generated resulting in end to end latency.

Accordingly, in light of these disadvantages associated with conventional augmented reality systems, there exists a need for systems and methods for low-latency stabilization for head-worn displays.

SUMMARY

According to one aspect, the subject matter described herein includes a system for low latency stabilization of a head-worn display. The system includes a low latency pose tracker having one or more rolling-shutter cameras that capture a 2D image by exposing each row of a frame at a later point in time than the previous row and that output image data row by row, and a tracking module for receiving image data row by row and using that data to generate a local appearance manifold. The generated manifold is used to track camera movements, which are used to produce a pose estimate. In one embodiment, a rendering unit receives pose estimates from the pose tracker, uses the pose estimates to predict a future pose at the time a pixel of a display will be drawn, where the pixel is part of an augmented reality image to be displayed on an optical see-through head-worn display, and renders the pixel just before it is drawn. In one embodiment, an augmented reality image comprising multiple pixels rendered by the rendering unit is displayed to a user via an optical see-through display through which the user can see a real scene and upon which the augmented reality image is displayed so that the augmented reality image overlays the real scene from the user's point of view.

According to another aspect, the subject matter described herein includes a method for low latency stabilization of a head-worn display. The method includes generating a scan line by a rolling-shutter camera that captures a 2D image by exposing each scan line of a frame at a later point in time than the previous scan line and outputs image data scan line by scan line; using the scan line to generate a local appearance manifold; using the generated manifold to track camera movements; and using the tracked camera movements to produce a pose estimate. In one embodiment, the method includes using the produced pose estimates are to predict a future pose at the time a pixel of a display will be drawn, the pixel being a part of an augmented reality image to be displayed on an optical see-through head-worn display, and rendering the pixel just before it is drawn. In one embodiment, the method includes displaying to a user an augmented reality image comprising multiple rendered pixels using an optical see-through display through which the user can see a real scene and upon which the augmented reality image is displayed so that the augmented reality image overlays the real scene from the user's point of view.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for low latency stabilization for head-worn displays. Reference will now be made in detail to exemplary embodiments of the present invention, examples of which are illustrated in the accompanying drawings. Wherever possible, the same reference numbers will be used throughout the drawings to refer to the same or like parts.

Just-in-Time Visual Tracking.

The subject matter described herein presents a new method of reducing latency that relies on the principles of bufferless input/output and "just-in-time" processing throughout the main components of an augmented reality system: tracking, rendering, and display. Tracking will take advantage of the line-sequential exposure (or "rolling shutter") of the inexpensive CMOS cameras found in mobile devices; each new line read out of such a camera produces a new one-line "snapshot" of the scene. When a new data line arrives from a cluster of such cameras in various orientations, it will be fed immediately to an efficient tracking algorithm to provide a new estimate of the user's pose. At the same time, a just-in-time renderer will draw the augmented scene in scanlines, each scanline reflecting the most recent tracking pose. Each scanline will be synthesized just before it is to be displayed, and the result will be streamed immediately to the display device. Each of these components will be designed to operate flexibly at independent rates, with the goal of minimizing the time between when a tracking observation is made and when the scene data relying on that observation is displayed.

Using this approach, a complete augmented reality (AR) system may be built using modified commodity hardware: a cluster of tracking cameras, a computing platform, and an optical see-through HMD. This system will be designed to operate at extremely low levels of latency—an unprecedented one to two orders of magnitude below existing systems—thus removing a significant barrier to the deployment of many AR applications. For camera-based tracking, a natural boundary on the system latency is given by the frame rate of the camera, i.e. the system latency is at least as big as the time between frames. The embodiments of the subject matter described herein make use of the fact that rolling shutter cameras—generally seen as a negative aspect of CMOS image sensors because of the distortions they can introduce in the captured images—provide a high-frequency sampling of the scene on a per-image-row basis. A novel high-frame-rate tracking approach with low latency is presented that leverages the rolling shutter present in modern CMOS cameras. For typical high-definition (HD) cameras, this approach can theoretically reach sampling rates of 30 kHz. In one embodiment, this incremental tracking is combined with a global visual mapping approach to overcome the inherent drift of the incremental approach.

Figure 1A:
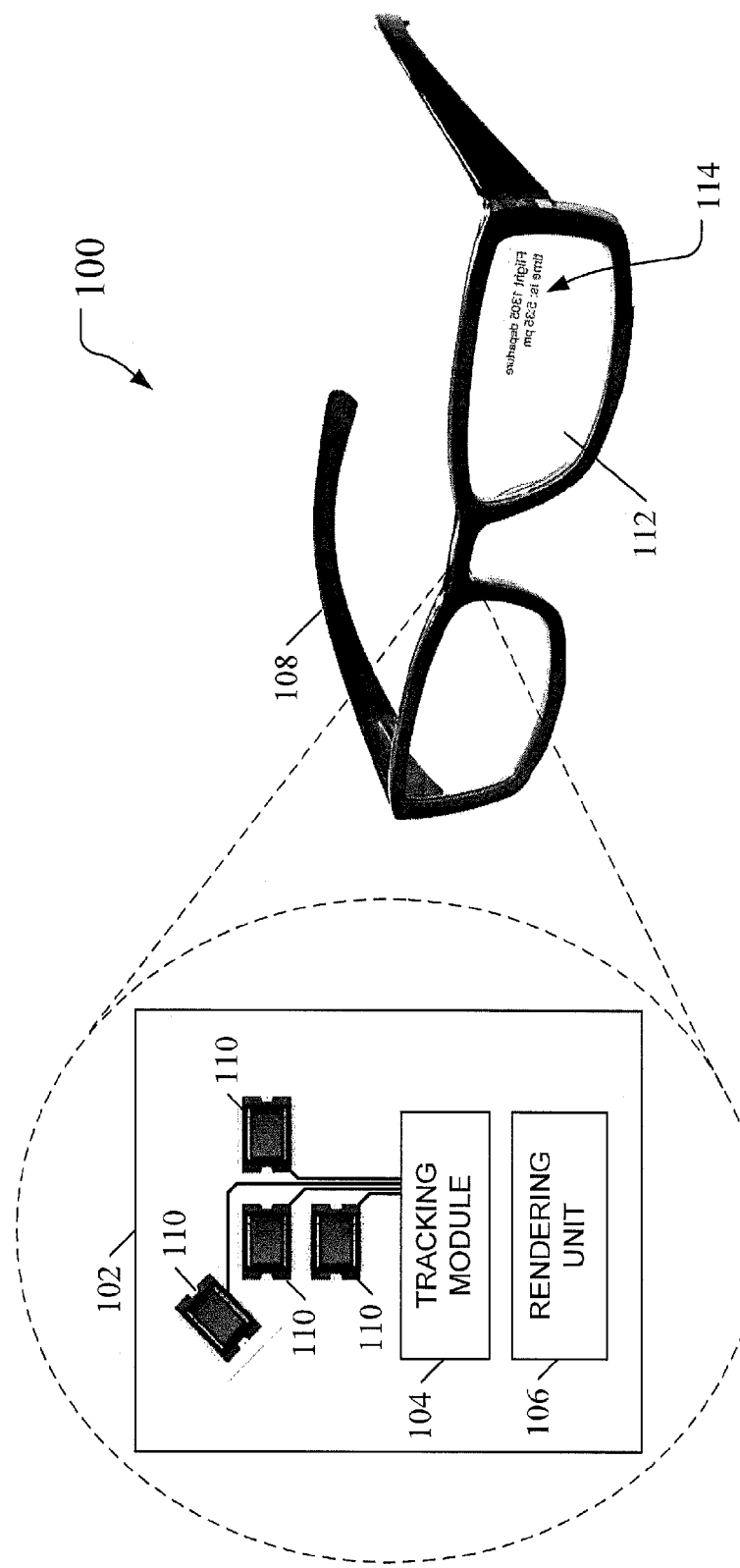
FIG. 1A is a block diagram illustrating an exemplary system for low latency stabilization of a head-worn display according to an embodiment of the subject matter described herein.

FIG. 1A is a block diagram illustrating an exemplary system for low latency stabilization of a head-worn display according to an embodiment of the subject matter described herein. In the embodiment illustrated in FIG. 1, system 100 includes a low latency pose tracker 102, a tracking module 104, a rendering unit 106, and a see-through optical display 108.

Rolling Shutter.

Pose tracker 102 includes a plurality of rolling-shutter cameras 110 that capture a 2D image by exposing each row of a frame at a later point in time than the previous row, and output image data row by row as soon as the exposure for that row is complete.

Figure 1B:
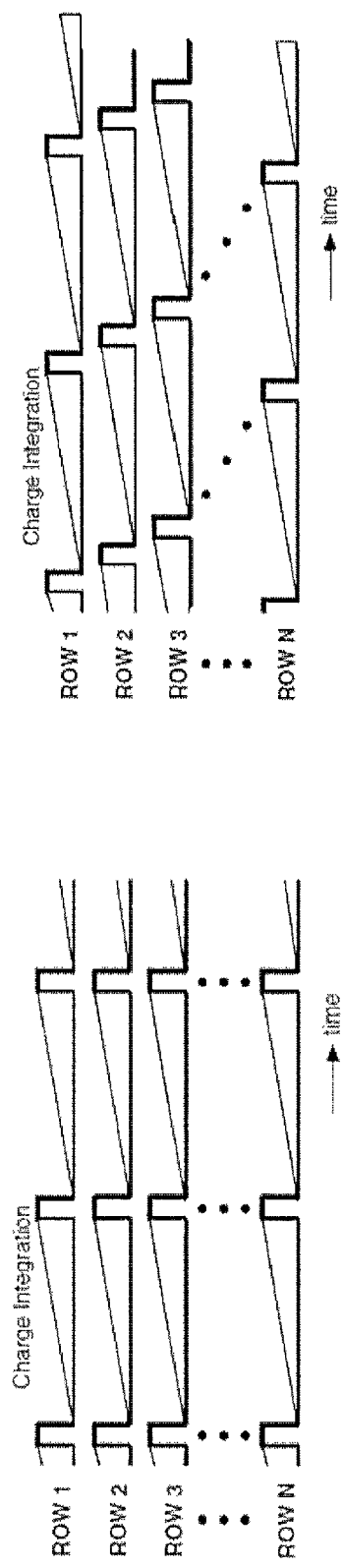
FIG. 1B is a timing diagram comparing capture timing for a global shutter camera versus capture timing for a rolling shutter camera according to an embodiment of the subject matter described herein.

FIG. 1B is a timing diagram comparing capture timing for a global shutter camera versus capture timing for a rolling shutter camera according to an embodiment of the subject matter described herein. In traditional CCD sensors (and global shutter cameras in general), all rows of pixels within a frame begin exposure at the same time. Suppose that a camera captures images at a frame rate of 30 Hz. For each frame, all rows of the frame begin integration at the same time. Based upon the exposure settings, all rows conclude integration at the same time. Next, the image is read out line by line to the host device and integration begins again for the next frame.

The timing diagram on the left side of FIG. 1B depicts a typical frame exposure scheme for global shutter cameras. This has significant advantages for rapidly moving cameras or scenes with rapidly moving objects as all pixels of the image are exposed simultaneously. The disadvantages are a reduced signal-to-noise ratio for the images given the limited integration time due to the longer read times for the frames.

In contrast, typical CMOS image sensors commonly found in handheld devices and mobile platforms do not utilize a global shutter. Instead, these sensors employ rolling shutters [47]. A rolling shutter causes each row of a frame to begin its exposure process at a slightly later time than the previous row. Hence each individual row a is "snapshot" of the scene at a slightly different point in time, and for moving cameras also at a different spatial position and orientation. This leads to motion artifacts within the frame. The exact time elapsed between the start of two rows' integrations depends upon the frame rate of the camera. As soon as a rolling shutter has finished exposing a particular row of pixels, that row is read out into line memory [24].

The timing diagram on the right side of FIG. 1B illustrates typical rolling shutter exposure behavior. Rolling shutters are generally seen as a negative property of CMOS image sensors because of the distortions they can introduce in the captured images. For many tasks a rolling shutter camera is acceptable because the camera's perceived motion of the scene is very slow compared to the rate at which the rows of a frame are exposed. To model a rolling shutter camera correctly, one has to model a pushbroom camera with a potentially different position and orientation for each row in the image. Hence traditional camera motion estimation techniques with a single fixed camera position and orientation per image only approximate the camera model. The methods presented herein will correctly model the rolling shutter camera as a set of pushbroom cameras. Visually observable artifacts of a rolling shutter occur if the perceived movement of the scene is non-trivial compared to the time between the exposure of two rows; more specifically, these movements can create skew, wobble, and other undesirable effects in the image [20]. These artifacts can pose problems for traditional salient feature detection methods as the image appearance of a 3D feature can significantly change due to the introduced distortions. Rather than working to eliminate such effects in order to preserve the visual quality of still images and video [3], as is done in conventional systems, the methods presented herein leverage the temporally uniformly distributed appearance sampling of the scene to achieve KHz-rate tracking with low latency.

Referring again to FIG. 1A, in one embodiment, cameras 110 are mounted in a known configuration of orientations and baseline distances between each camera. In one embodiment, each camera stores row data into a row memory as soon as the exposure for that row is complete.

In one embodiment, cameras 110 are low cost, custom-made rolling shutter cameras, each equipped with a standard 2D image sensor, which provide an interface to the sensor's raw scan line data, unlike commercially available cameras, which only allow retrieval of entire frames of data despite the fact that some scan lines of a frame are fully formed long before the frame is exposed in full. The use of 2D image sensors does not slow down pose estimation since just a very few scan lines of an image are processed at any given time. In one embodiment, only one scan line of the 2D image sensor is processed at a given time. This approach provides significantly more flexibility than is provided by a 1D line of sensors in that the 2D image sensor may essentially act as a set of 1D lines of sensors, but at a much higher density. Plus, in the event of degenerate scene (e.g., where there is not enough information to determine motion, system 100 has access to the entire 2D image, from which it may be able to extract additional information which it can use to resolve the degenerate case. For example, pose tracker 102 may compose 2D images from scan line data and use feature points and other recognition techniques to determine the absolute pose of the system—information to which systems using 1D sensors do not have access. This 2D image information may be used by system 100 to remove accumulated pose errors, which allows a more precise pose estimation with greater immunity to what would, to systems using 1D sensors, be degenerate cases.

Tracking module 104 receives image data row by row from cameras 110, generates a local appearance manifold, uses the generated manifold to track camera movements, and produces a pose estimate. The local appearance manifold may be linearized and/or low pass filtered. In one embodiment, a Kalman filter is applied to the manifold. Producing a pose estimate may involve using an algorithm to iteratively improve the pose estimate. In one embodiment, the pose estimation algorithm may incorporate data provided from an onboard inertial measurement unit.

Rendering unit 106 receives pose estimates from the pose tracker, uses the pose estimates to predict a future pose at the time a pixel of a display will be drawn, the pixel being a part of an augmented reality image to be displayed on an optical see-through head-worn display, and renders the pixel just before it is drawn. In one embodiment, rendering the pixel just before it is drawn includes determining which row of the augmented reality image will be displayed next and rendering the pixels of that row prior to the time that row is displayed. In one embodiment, rendering unit 106 predicts how the calculated pose is likely to change between the first time that the row will be next displayed, referred to as "T1", and the second time that the row will be next displayed after time T1, referred to as "T2". Rendering unit 106 may then render the pixel at its estimated location L1 at time T1, at its estimated location L2 at time T2, or at a location L3 somewhere between locations L1 and L2.

Optical see-through display 108 displays to a user an augmented reality image comprising a plurality of pixels rendered by the rendering unit. In one embodiment, display 108 includes a transparent body 112 through which the user can see a real scene and upon which the augmented reality image 114 is displayed so that the augmented reality image overlays the real scene from the user's point of view. For example, transparent body 112 may be a liquid crystal display (LCD), an organic light emitting diode (OLED), or a transparent surface upon which augmented reality image 114 is projected, such as glass or plastic.

In one embodiment, one or more of the components of system 100 may be fabricated on a single semiconductor die or otherwise integrated together, which provides the additional advantage of reducing the distance of the data paths between the functional components.

In one embodiment, rendering unit 106 and display 108 may assume that pose tracker 102 provides extremely frequent pose updates (on the order of many kHz). The upper bound of relevant pose updates is a new pose estimate for each scan line drawn, as otherwise the older update would simply be ignored. Rendering unit 106 and display 108 may also assume that pose extrapolation to the exact moment the scan line is drawn (or midpoint of its duration) is straightforward. This extrapolation would require knowing the exact timing of when the scan line is drawn, including knowing both what line is currently being scanned out and the propagation, buffering, and switching delays of a given display (and refresh rate if doing midpoint). Using this target time and past pose estimates a standard Kalman filter can provide an accurate estimate of the future pose. In short, in separately designing the renderer and display driver it may be safely assumed that pose tracker 102 can provide the exact pose of the head worn display system at the exact moment that each line is drawn on the display.

In one embodiment, system 100 may implement a naive rendering solution that renders each scan line for the exact position of when it is drawn so that it is exactly correct. Rendering a single scan line is an expensive operation, however, as every polygon in the scene must still be transformed to determine whether or not it intersects the scan line, which is almost as expensive as rendering an entire frame. Such an approach increases rendering load by a factor of vertical resolution, e.g., an increase of three orders of magnitude by today's standard (1080p).

In an alternative embodiment, system 100 may maintain a working set of all polygons that could intersect a given scan line. Although similar in concept to conventional approaches, these conventional approaches were based on a simplifying assumption that there would be no motion or change of pose between successive scan lines and thus the primitives that intersected a given line were already known. For example, conventional scan line renderers were implemented by three successive sorting functions, once each for camera space axis (x and y in pixel space and depth z). Upon starting a new line these conventional scan line renderers would simply check the next polygon in the sorted list. This assumption that there would be no change of pose between scan lines makes these conventional scan line renderers unsuitable for use in head-worn units, for example, where pose changes are not only possible but highly likely. In short, previous scan line renderers simply would not work.

To overcome the disadvantages of conventional scan line renderers, the subject matter described herein accommodates changes of pose, by continually recalculating or re-identifying the polygons that will intersect the scan line about to be displayed. System 100 takes advantage of the fact that pose updates can be quite frequent. Rather than being a liability, the relative high frequency of pose updates allows system 100 to take advantage of temporal coherence of the scene: since the time between scan lines is very small (e.g., tens of microseconds) it is known that the motion will also be small, which limits the amount by which the pose can change. This enables system 100 to keep a set of polygons that potentially intersect a given scan line and drastically reduce the number of transformations necessary. In one embodiment, for example, a set of polygons may be identified for the first line of a new frame and only incrementally updated, rather than completely recalculated, with each successive scan line. Furthermore, temporal coherence allows rendering unit 106 to limit the number of polygons that must be considered during the incremental update operation, further improving performance.

In one embodiment, rather than rendering the entire screen, rendering unit 106 may render regions of the screen (i.e., groups of scan lines) from a single pose and warp the pixels of successive lines to match future pose estimates. For example, rendering unit 106 could render groups of 16 scan lines from a single pose estimated for the time during which the first line is drawn. The first line is rendered and drawn exactly, but the other lines would be several scan lines late by the time they are drawn. For each successive line, its position at the time that it will be drawn can be estimated, and a 3D warp may be applied to the rendered depth image to account for this offset. Since the offsets should be very small (due to the small amount of motion between scan lines) there will be fewer artifacts as compared to conventional post-rendering warp techniques.

One disadvantage to rendering a block of scan lines with a single pose is that screen tearing occurs where the block ends and the next begins. Thus, in one embodiment, an interlaced display may be used to minimize this effect by distributing the tearing across the entire display, which makes it less noticeable overall. Since the majority of conventional displays don't use interlacing, and also since none of them provide access to internally used counters such as what line is currently being drawn, but instead use cathode ray tube (CRT)-like timing sequences utilizing vertical and horizontal synchronization pulses that tell the driver when to begin a new line and when to begin a new frame, in one embodiment system 100 includes custom display driver hardware to provide an interlaced display with access to line counters. In one embodiment, system 100 includes a field programmable gate array (FPGA) with a DVI output with non-standard timing signals that cause standard displays to operate in interlaced mode. For example, the custom display driver hardware may generate double hsync pulses with no data in between them, which cause the display to skip lines and thus operate in interlaced mode.

In one embodiment, optical see-through display 108 may include a passive matrix organic light emitting diode (PMOLED.) A PMOLED differs from an active matrix OLED, or AMOLED, in the way that the display values are held. An active matrix has capacitors to hold the charges of each pixel value to keep it illuminated throughout the entire frame's duration. In contrast, a PMOLED has no storage for the charges and each line is illuminated sequentially (and integrated into a full image on the observer's retina). Due to being off most of the time, the lines must be illuminated much brighter. The combination of scan-line rendering by rendering unit 106 with a PMOLED has the advantage that, when each scan line is lit, the pixels on that scan line are always exactly or almost exactly aligned, e.g., having an alignment error so low as to be imperceptible to the user. Moreover, because the other scan lines are not actively lit when they are not being updated, it is not necessary to perform some type of midpoint prediction or motion blurring across an interval, as might be necessary for displays that are continuously lit.

Tracking Model.

Tracking camera motion using video is a well-established research area in computer vision [57, 58, 56] and robotics [12, 13, 52], and it is frequently leveraged by augmented reality systems for pose estimation. There are several different algorithms for tracking the camera position, which can be grouped in two different classes of methods; the first class of methods uses sparse salient features for camera motion estimation [58], the second class directly uses the global scene appearance for estimating the motion of the camera.

The salient-feature-based methods deploy tracking or matching of the salient sparse features in the image to compute the camera position from the feature motion (often termed structure from motion). Alternatively, simultaneous localization and mapping (SLAM) is used to obtain the camera position through a filtering approach [12]. The feature-based methods have been shown to allow real-time tracking at frame rate through fast RANSAC [19] techniques, such as our real-time RANSAC [64]. On the other hand, these techniques require the full frame to be present at motion estimation time and thus have an inherent minimal latency of at least one camera frame time. To achieve low-latency tracking, one would have to significantly increase the frame rate of the camera, thereby mandating shorter exposure times and lower signal-to-noise ratios which are detrimental for tracking quality. Hence today's full-frame processing cannot meet the demands of low-latency tracking. The subject matter presented herein uses fast low-latency tracking to break through the imposed minimal latency of the feature-based techniques by exploiting rolling shutter cameras as high-frame-rate pushbroom sensors.

Our method falls in the second class of appearance-based tracking. These methods use the global image appearance to formulate the tracking problem in the camera parameters [30, 26]. Since the global image appearance changes with illumination, these methods either rely on constant scene appearance or on a known parametric model of the scene appearance under illumination changes. Murase and Nayar [48] propose to project the appearance into a hyperspace parameterized in the illumination and object position. Note that this requires object segmentation and illumination determination in order to compute the parametric model. Other methods represent the object in separate linear subspaces for different illuminations [4, 25, 2] to overcome the illumination constancy requirement. These methods require significant effort to obtain the linear subspaces, which effectively require object segmentation and often controlled capture of the reference data. This makes the above methods practically impossible to use outside the lab. Methods to overcome the limitation of the controlled captures learn the objects' appearance space offline through patch-based appearance model approximation [7]. Elgammal et al. [15] for example describe learning a generative model of the objects' appearance space to compute the geometric transformation of the object or of the camera position respectively. Our method overcomes these restrictions by simultaneously tracking and sampling the local appearance manifold. Given the sampling of the appearance manifold at frame rate, our methods will naturally adjust to changing scenes and variations in illumination.

System 100 provides the further advantage that, in the event that scan line based motion estimation from a scene's local appearance manifold is not capable of providing accurate high frequency pose updates, other traditional techniques from structure from motion or simultaneous localization and mapping (SLAM) can be employed on small subgroups of lines of the image which use the same custom hardware described in the previous section. The entire tracking system's design is not strictly dependent upon the success of the motion estimation algorithm; on the contrary, the tracking algorithm is simply a modular piece of the system which can be modified to achieve the best possible performance.

The relatively high frequency pose updates provided by pose tracker 102 gives system 100 an inherent advantage over conventional systems. Even systems that generate camera pose estimates by iteratively analyzing the feature points found within smaller segments of a larger image can benefit from the systems and methods described herein, since subgroups of rows can be analyzed as soon as they are exposed it is no longer necessary to wait for the entire frame to be exposed before performing a motion estimate on the first handful of a frame's scan lines.

In one embodiment, pose tracker 102 extends our preliminary approach from Yang et al. [73], which leverages a local linearization of the appearance manifold of the scene, e.g., by using the global appearance space of a specific scene under the current illumination, which eliminates the need for learning the global appearance of the scene; it also does not require the consideration of the scene appearance under varying illumination. The scene's appearance manifold is spanned by the scene appearance as captured by the images under the possible camera positions and orientations. Each image is considered to be a vector $I \in R^n$ that contains all its n pixels color values. The camera is considered to have six degrees of freedom for its motion and if it moves through the scene capturing images $I_t$, it samples the appearance manifold of the scene under the current illumination. Given that the camera has only six degrees of freedom, the appearance manifold can at most have dimensionality six. In addition, it is clear that a mapping $f(\bullet)$ from the camera parameters P to the appearance manifold or images I exists. The mapping $f(\bullet)$ allows us to obtain the image $I=f(P)$ from the camera parameters, if the appearance manifold of the scene is known.

Typically, the appearance manifold of the scene will be highly non-linear, which will require a high number of samples in order to obtain the appearance manifold of the scene as seen from prior art approaches. This is prohibitively expensive, and the samples would have to be reacquired if the illumination of the scene changes. Hence learning the full appearance manifold is practically infeasible for an AR system that is deployed in unconstrained environments. In one embodiment, pose tracker 102 exploits a locally linear representation of the appearance manifold, along with an efficient method to simultaneously track the camera motion and re-learn the local appearance manifold, and can thus naturally adapt to illumination changes and dynamic objects in the scene without requiring an explicit relearning of the scene's appearance manifold.

In one embodiment, to linearize the local appearance manifold, consider a camera $P_0$ at time t, which acquires image $I_0$: it can be assumed that m nearby images $I_0, \ldots, m-1$ also taken at time t from perturbed camera positions $P_1, \ldots, m$ are known. The local appearance manifold $I(P)$ for $P_0$ can be linearized using the camera samples k=1 . . . m as follows:

$$I_k = I_0 + \underbrace{\frac{\partial I(P)}{\partial P}}_{F} \underbrace{(P_k - P_0)}_{dP_k} \quad (1)$$

$$dI_k = F dP_k$$

with image I seen as n-dimensional vectors containing the pixels of the image and $dI_k$ being the difference of image $I_0$ to $I_k$ in vector form. $P_k$ is the six-dimensional camera pose parameter vectors and dP is the difference vector between $P_0$ and $P_k$. F represents the linearized appearance manifold and is equivalent for all samples. For each particular appearance sampler, Equation (1) is underdetermined to solve for the change dP, but the constraints of all m views can be combined to $$[dI_1, \ldots, dI_m] = F[dP_1, \ldots, dP_m] \quad (2)$$

If the m images provide six linearly independent constraints, Equation (2) can be solved as a least squares problem. To maximize applicability, in one embodiment the number of images is reduced to a minimum m=6 to recover the camera motion of a new image $\tilde{I}_0$ by solving $$Fd\tilde{P} = d\tilde{I}_0 \text{ with } F = [dI_1, \ldots, dI_m][dP_1, \ldots, dP_m]^{-1} \quad (3)$$

where $d\tilde{I}_0$ is the difference image between image $I_0$ at time t and the new image $\tilde{I}_0$ at time t+1. This provides the incremental camera motion $d\tilde{P}$ through a linear solution of Equation (3) if the m=6 views span the local linearized appearance manifold. One approach to obtain those six views will now be described.

Figure 1C:
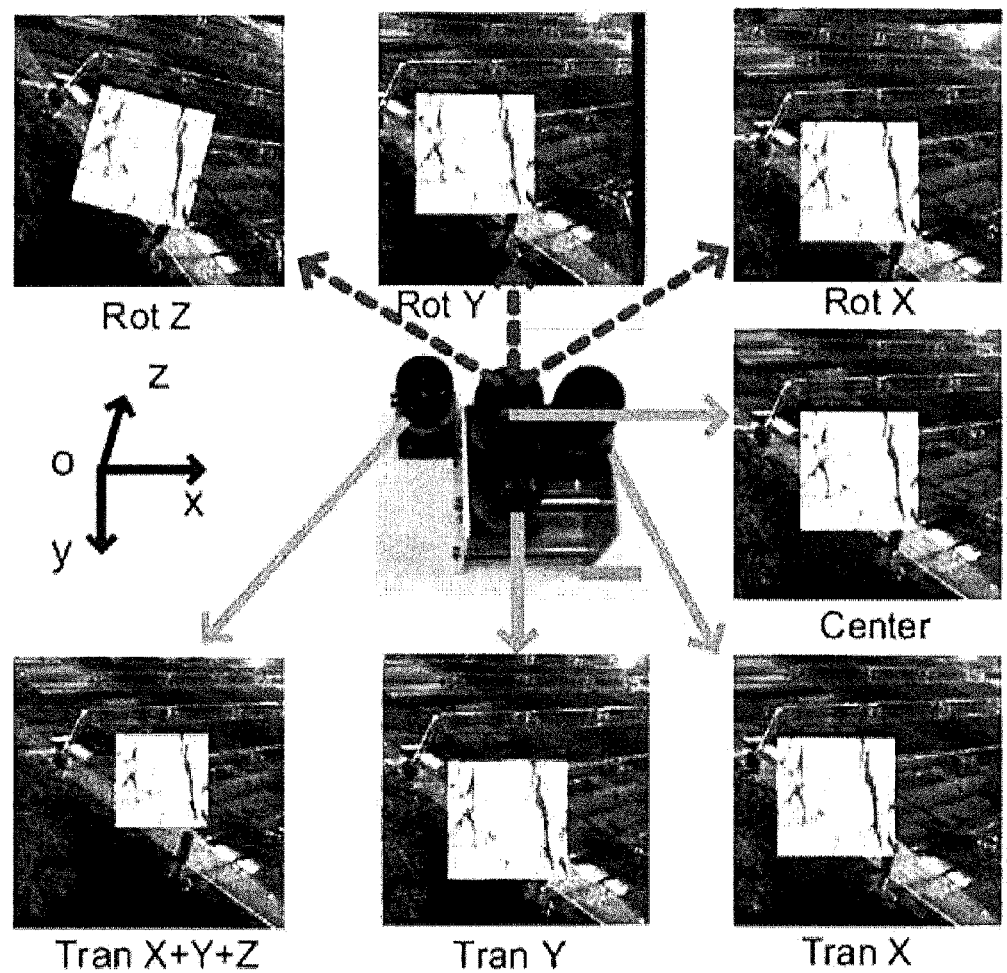
FIG. 1C illustrates a system according to an embodiment of the subject matter described herein that includes three auxiliary cameras which are offset in the x-direction, the y-direction, and the z-direction to obtain three samples in orthogonal directions.

FIG. 1C illustrates one embodiment of system 100 that includes three auxiliary cameras which are offset in the x-direction, the y-direction, and the z-direction to obtain three samples in orthogonal directions. Additionally, it is possible to obtain from each of the four cameras (reference camera and the three offset cameras) three rotated views by virtually rotating the cameras around the three axes of the coordinate system. These virtually rotated views correspond to the images captured by rotated cameras. For non-degenerate scenes, these images provide the constraints needed to estimate the differential camera motion $d\tilde{P}$.

One advantage to this approach is that tracking will be possible in highly complex and irregular scenes, even in the presence of reflective surfaces, semi-transparent surfaces and curved mirrors. The imposed environmental restrictions can be kept to a minimum, guaranteeing maximal flexibility for the tracking and hence the applicability of the AR system.

Moreover, the solution can be obtained very efficiently by solving a 6×6 linear equation system, which can be performed in real-time. The major drawback of our preliminary approach Yang et al. [73] is the restriction on the magnitude of the motion, for which the linearization of the appearance manifold is accurate. In order to be valid, the motion of the scene has to be sub-pixel in magnitude. System 100 overcomes a restriction on the magnitude of the motion for which the linearization of the appearance manifold is accurate through high-frequency camera motion tracking, which it achieves by leveraging the rolling shutter of the camera.

Vision-Based Tracking with a Rolling Shutter.

The appearance tracking as described above overcomes the need for explicit feature detection in order to perform tracking, which our extended tracker exploits to perform tracking on single rows of the image or on small sets of rows of the image. This enables camera motion estimation at frequencies up to three orders of magnitude above the regular frame rate. Our method leverages the continuous temporal sampling of the camera motion through the image rows delivered by the rolling shutter.

Our preliminary work [73] linearizes the appearance manifold of the full image to obtain the differential camera motion parameters $d\tilde{P}$ for a new image $\tilde{I}$ at time t+1, by using the m=6 samples of the appearance manifold taken at time t. To perform tracking using a single row or a small set of rows $\{r\}$ sampled at time t+1, Equation (1) is formulated in the set of pixels belonging to the available set of rows $\{r\}$:

$$I_k^{\{r\}} = I_0^{\{r\}} + \underbrace{\frac{\partial I(P)^{\{r\}}}{\partial P}}_{F^{\{r\}}}(P_k - P_0) \quad (4)$$

$$dI_k^{\{r\}} = F^{\{r\}} dP_k$$

with $I_0^{\{r\}}$ corresponding to the set of lines $\{r\}$ and $dI_k^{\{r\}}$ the corresponding set of pixel differences. Please note that in Equation (4) the constraints are still formulated in the full set of differential camera motion parameters dP. Hence even the set $\{r\}$ of image lines provides constraints on the full camera motion. As before, a single set of rows from one sample does not provide a sufficient number of constraints to solve for the differential camera motion parameters dP. Hence the appearance manifold may be sampled again, using three additional cameras offset in the x-direction, y-direction, and z-direction, as well as virtual views created through homography warping. In analogy to Equation (3), it is possible to formulate the camera motion estimation for the set $\{r\}$ of sampled rows as follows:

$$F^{\{r\}} d\tilde{P} = d\tilde{I}_0^{\{r\}} \text{ with } F^{\{r\}} = [dI_0^{\{r\}}, \ldots, dI_m^{\{r\}}]$$
$$[dP_1, \ldots, dP_m]^{-1} \quad (5)$$

Using Equation (5), pose tracker 102 is able to determine the camera motion after each single row or after each set of rows $\{r\}$, by solving a linear equation system, which can be performed in real time. In practice it is expected that $\{r\}$ will contain a single row or a few tens of rows at most. The ability to use small fractions of the image to track the differential camera motion enables pose tracker 102 to perform tracking with a sampling rate s of $$S = \frac{\#(\text{rows})(\text{camera frame rate})}{|\{r\}|} \quad (6)$$

For a camera with 30 Hz frame rate and approximately 1,000 rows, the sampling rate of our approach can theoretically approach 30 kHz by simply leveraging the high-frequency sampling of the rolling shutter architecture. This tracking rate exceeds all available tracking systems' rates, even if for practical reasons only a rate an order of magnitude smaller may be reached While this approach can use each newly sampled row of the new image at time t+1, it may also use the full images from time t, which satisfies the requirement of sub-pixel motion between frames or between the previous image and the sampled row, which in case of fast camera motion (e. g. head motion) does not hold for the difference between two frames.

To enable pose tracker 102 to track even in these extreme motion conditions, pose tracker 102 exploits the observation of Forsse and Ringaby's [20] analysis of motion artifacts for rolling shutter cameras: the major source of image motion between frames is camera rotation. When estimating the motion of the camera from the set of rows $\{r\}$, the estimated motion of the previous set of rows from the previous estimation is known. Pose tracker 102 may use this estimate as a prediction for the camera motion to be estimated from the current set. This prediction is very accurate due to the fact that the estimate was the exact camera motion 1 seconds ago, which in practice, with s being in the kHz range, is very small. Given the predictive camera motion, pose tracker 102 can compensate for the major source of image motion (rotational motion) using the predicted rotation. The rotational motion of the camera can be compensated through a homography $H_R = KR^TK^{-1}$ with K being the camera calibration matrix and R the differential rotation of the camera estimated from the previous set of rows. Given the differential camera motion, a homography can be computed for each of the sample images at time t. This motion compensation can then be used to compensate the rotational motion by incorporating the prediction into Equation (5):

$$F_R^{\{r\}} d\tilde{P} = d\tilde{I}_{R0}^{\{r\}}, \text{ with}$$

$$F_R^{\{r\}} = [((I_{\tilde{k}} - H_{R0}I_0)^{\{r\}}, \ldots, (I_{\tilde{k}} - H_{R_{m-1}} I_0)^{\{r\}}][dP_0, \ldots, dP_{m-1}]^{-1} \quad (7)$$

Eliminating almost all the rotational image motion due to the extremely high sampling rate s ensures that a large range of motions fulfill the sub-pixel motion constraint. Hence it is expected that system 100 will to be able to track in all practically relevant situations.

Degenerate cases. For the sampling and camera motion computation using full images [73], one of the degenerate cases are far away scenes as they do not provide translational constraints; hence the solution of Equation (3) becomes under-constrained, leaving a three-dimensional family of solutions. This degenerate case will similarly apply to our camera motion estimation leveraging Equation (7).

Tracking drift. Given the incremental approach of the appearance-based tracking algorithm used by pose tracker 102, the integration of accumulated errors will lead to drift over time. Analyzing the sources of drift revealed that the methods described herein only accumulate frame-to-frame drift, but does not accumulate the tracking errors of the multiple sets of rows $\{r\}$ in the image. The reason for avoiding the accumulation of the per-row set tracking is that each row set is tracked with respect to the previous frame's appearance manifold. Incorporating the rotation compensation does not change this behavior. Hence the major source of drift error is the frame-to-frame drift of the system.

In one embodiment, the effects of the observed frame-to-frame drift may be compensated for by coupling pose tracker 102 with a global tracker that uses traditional structure from motion methods to build a map of the environment to serve as absolute reference frame. We will combine the proposed tracker with our method from Clipp et al. [6]. This will suppress the frame-to-frame drift by using salient environment features to determine a global camera pose. The suppression of the drift will be performed at frame rate but since it is only computing a long-term correction, this process does not have to be at the system's highest tracking rate.

High Level Architecture.

In order to bring a high-frequency, row-wise rolling shutter motion tracker to fruition, we must stray from today's typical CMOS image sensor controller design. Related previous work ([21], [49]) assumes that all image sensor addressing, row-wise readout, and exposure control is driven by the image sensor control board. As such, we propose the creation of a lightweight custom control board which acts as a thin glue layer between the CMOS sensor and the host device. The only purpose of the control board will be to expose and retrieve rows from the CMOS sensor as rapidly as possible, immediately forwarding that data to the host device. By utilizing USB 3.0 technology, we expect to avoid the data transfer bandwidth issues that the real-time tracking cameras introduced by Muehlmann et al. [47] faced. Additionally, the use of USB 3.0 will allow the tracking system to be extremely portable to other systems which may require low-cost, low-power, high-frequency motion tracking. To minimize the camera's sensor-to-host latency, no image processing will be performed by the camera hardware.

By taking such a simplistic approach, our custom cameras will remain low-cost, low-power, and extremely small, fitting the performance profile necessary for a mobile augmented reality system. After prototyping our cameras using off-the-shelf CMOS image sensors and controllers implemented on FPGA boards, we plan to create a custom driver and API for the camera. This low-level code will allow a user-defined program to grab 'incomplete' frames from the camera, providing the interface needed for just-in-time operation. Muehlmann et al. [47] created a new type of motion tracking camera by using an FPGA to implement a controller for IMEC's FUGA 1000 CMOS image sensor. We will also investigate the possibility of creating an integrated controller for all four cameras of a cluster to enable computation of the results in FPGA. Depending upon the operating system used onboard the augmented reality system, it may be possible to modify open-source drivers (such as libdc1394) in order to drive our prototype.

Rendering.

Rendering is a significant source of latency in existing augmented reality systems. Today's CPUs and graphics APIs are designed for high throughput rather than low latency and worse, they are designed to buffer an entire frame of data before display. For a 60-Hz display, frame buffering alone incurs minimum latency penalties of 16 ms and 33 ms at the top and bottom of the display respectively.

Our general approach is to reduce rendering latency through "just-in-time" pixel processing [54], which draws each scanline with the most recent viewing transformation (i.e. tracking pose estimate) and immediately sends it to the display. This approach offers the potential of a dramatic reduction in rendering latency by a factor equal to the number of display scanlines. For example, this techniques allows the latency of a 60-Hz, 1,000-line display to be reduced from 16 ms (one frame) to 16 µs (one scanline), a 1,000-fold improvement.

However, a key challenge of just-in-time scanline rendering is the loss of spatial coherence across the frame. Since the viewing transform may change with each newly rendered line, rendering algorithms cannot assume that transforms applied to graphics primitives are consistent across lines, nor can they assume continuity between the set of primitives that fall among adjacent lines. In the general case, all geometric transformation and sorting operations must be recomputed at each scanline, reducing the performance of these operations by several orders of magnitude. However, when the change in viewing transforms from one scanline to the next can be tightly bounded, as is the case for a tracked user over a short time period, much of the spatial coherence can be recovered.

We present efficient just-in-time rendering algorithms given view transform bounds across scanlines. These algorithms include the following improvements over conventional methods:

1. Adaptation of existing scanline rendering algorithms [71, 53, 40, 14]: These algorithms perform an initial y-sort of the geometric primitives (triangles) that must be recomputed at each new scanline; however, we propose the use of sorting algorithms that are efficient for nearly sorted data and take advantage of a known maximum distance between each primitive's current and final sorted position.

2. Adaptation of a post-rendering 3D warp [46]: We propose periodically generating a color-plus-depth map from the current viewing position and from an estimated future position that will be combined into a new rendering through a 3D warp. Warping will be performed at each scanline using the most recent estimated viewing position. To perform this process efficiently, we will warp only regions of the color-plus-depth map that are within the bounded region representing all possible changes in the viewing transformations across scanlines.

3. Ray casting with acceleration structures [36, 55] is already suited for incoherency between scanlines. At each pixel, the corresponding ray can be efficiently tested against all scene geometry using hierarchical structures, such as k-d trees or BSP trees.

We note that modern desktop GPUs are designed for general-purpose parallel floating point computation, and can thus be adapted to a variety of rendering algorithms; mobile GPUs are increasingly following this trend as well. We also note that for each of these algorithms, we can generally trade off rendering performance for latency by adjusting the number of scanlines that are rendered together with full spatial coherency.

Display Interface.

Figure 2:
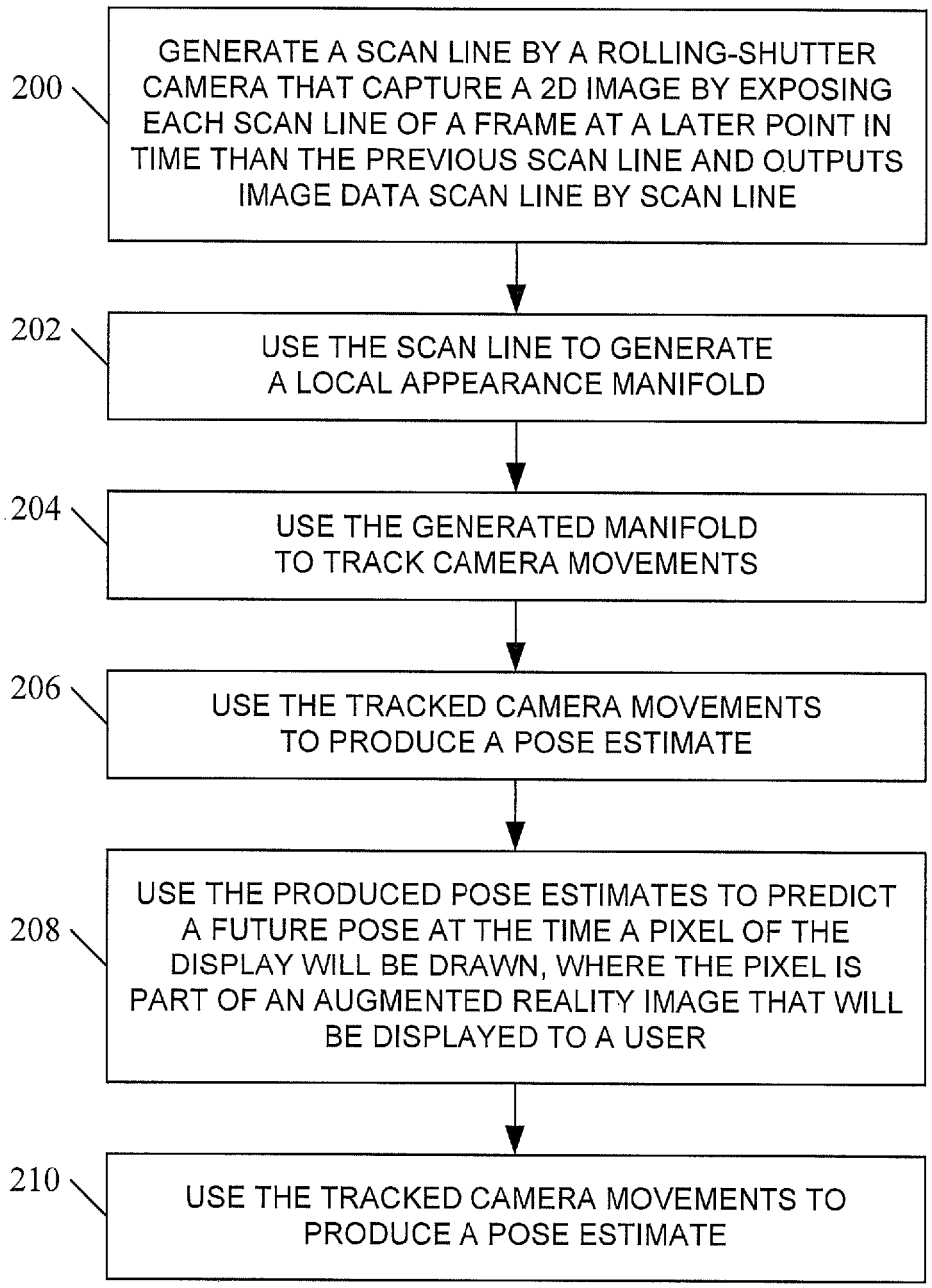
FIG. 2 is a flow chart illustrating an exemplary process for low latency stabilization of a head-worn display according to an embodiment of the subject matter described herein.

After rendering a scanline, we must ensure that the new data is displayed as quickly as possible. In our proposed system, we will reduce display latency through three primary means:

FIG. 2 is a flow chart illustrating an exemplary process for low latency stabilization of a head-worn display according to an embodiment of the subject matter described herein. The method includes, at step 200, generating one or more scan lines from one or more rolling-shutter cameras. Each rolling shutter camera captures a 2D image by exposing each scan line of a frame at a later point in time than the previous scan line, and outputs image data. In one embodiment, multiple cameras are mounted in a known configuration of orientations and baseline distances between each camera. At step 202, a scan line from one or more cameras is used to generate a local appearance manifold. In one embodiment, the manifold is generated by using one scan line from each of multiple cameras. Alternatively, the manifold may be generated from one scan line from one camera, from a small number of scan lines (i.e., less than a full frame) from one camera or from multiple cameras. In this manner, a manifold may be generated using less than a full frame of data from the camera or cameras. In one embodiment, the scan line data from the camera(s) may be buffered, such as by being stored in a scan line memory, from which it may be retrieved and used to generate the manifold. In one embodiment, the manifold may be linearized or low pass filtered. In one embodiment, a Kalman filter may be applied to the manifold. At step 204, the generated manifold is used to track camera movements. In one embodiment, data from an onboard inertial measurement unit may be used as part of the pose estimation operation. At step 206, the tracked camera movements are used to produce a pose estimate. The pose estimate may be iteratively improved. At step 208, the produced pose estimates may be used to predict a future pose at the time a pixel of a display will be drawn, where the pixel is part of an augmented reality image that will be displayed to a user, and, at step 210, render the pixel just before it is drawn.

In one embodiment, the augmented reality image may be displayed to the user via an optical see-through head worn display that includes a transparent body through which the user can see a real seen and upon which the augmented reality image is displayed so that the augmented reality image overlays the real scene from the user's point of view. For example, rendering the pixel just before it is drawn may include determining which row of the augmented reality image will be displayed next and rendering the pixels of that row prior to the time that row is displayed. The transparent body of the optical see-through head worn display may be an LCD, an OLED, a transparent surface upon which the augmented reality image is projected, or other surface.

In one embodiment, rendering the pixel just before it is drawn includes considering the predicted change of pose between the first time T1 that the row will be next displayed and the second time T2 that the row will be next displayed after time T1 and rendering the pixel at either the estimated location L1 of the pixel at time T1, the estimated location L2 of the pixel at time T2, or at a location L3 between locations L1 and L2.

Although the systems and methods described herein have low latency and are thus well suited for optical see-through displays, the same concepts may be applied to other types of displays as well. In addition, latency may be further reduced by the benefits which chip circuit integration provide, including reduction of data path lengths and associated data path delay, obviation of the need for buffers or drivers and their associated delays, etc. For example, one or more custom cameras could be fabricated on a single die, which could also include circuits to perform the tracking and pose estimation functions, circuits to render the augmented reality image, and circuits to display the rendered augmented reality image, etc.

Optimizing tracking, rendering, and display together, rather than separately, gains significant benefit for mobile augmented reality systems. The combination of just-in-time sensing and just-in-time rendering within a unified framework enables much greater gains than utilizing each separately. Such systems can take advantage of a unified memory (available on mobile devices) to avoid time consuming data transfers. Furthermore, very fast update of tracking (not only with prediction) is necessary to take full advantage of the just-in-time rendering.

Evaluation.

Several evaluation phases for our new low latency approach to augmented reality were performed, including: measurements of system characteristics to establish engineering performance specifications; user detection of latency-induced misregistration or motion of the synthetic-image in a highly constrained test case that minimizes potential confounders on the measurements; user detection of tracking or latency-induced misregistration or image motion in a more ecologically valid test environment; comparison of user task performance while subject to our best end-to-end latency to performance under latency 50 to 100 times higher. Although we will did not engage real users (e.g., surgeons) in our evaluation, we simulated use of an AR-guided medical tool as our use case. The field of usability engineering recommends a sequence of increasingly more ecologically valid and formal user evaluations throughout product development [23]. It is regular practice in our laboratory to test first in a constrained environment to minimize confounders and then in more ecologically valid environments [72].

Figure 3:
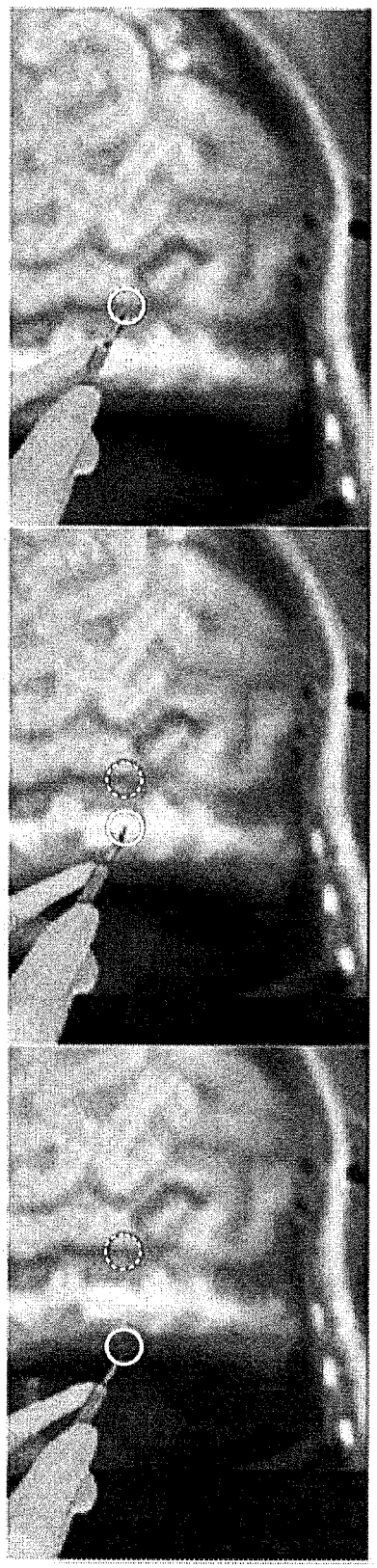
FIG. 3 shows simulations of latency for surgery application with augmented reality overlay (organs) comparing the performance of conventional systems to the systems and methods described herein.

FIG. 3 shows simulations of latency for surgery application with augmented reality overlay (organs) comparing the performance of conventional systems to the systems and methods described herein. Images show scalpel location (solid white circle) and corresponding location of augmented overlay that should appear under scalpel (dotted white circle). The displacement of the augmented imagery is due to the latency of tracked head movement for a head moving at a moderate speed of 50°/sec with imagery at arms' length (60 cm). Left: 100 ms latency, typical of an ordinary AR system. Middle: 50 ms latency, typical of an AR system designed for low latency. Right: 1 ms latency, the performance of the subject matter presented herein. 1 ms latency assumes a 60 Hz camera update rate for a 1000 line camera and a total budget of 60 scanlines latency for camera acquisition, tracking, rendering, and display.

Establishing engineering specifications. During the development of the low latency system, we defined and ran procedures to measure: system update rate; total latency (from clock that reads a new scanline of camera data to a pixel being changed on the display); tracker accuracy over a volume of points and paths in 3D under conditions of a range of head poses (especially rotation/yaw) and head turn speeds; tracker jitter over the volume of points and paths in 3D both when the tracking unit is held stationary and when it is moving; and end-to-end system latency in an AR system configuration.

Detection of Latency-Induced Misregistration/Motion Between Real and Synthetic Imagery.

Users generally detect latency by noticing its visual side effects, such as unexpected motion in the rendered scene. In AR systems this manifests itself as dynamic misregistration between real and rendered objects. There have been several psychophysical studies to understand the effects of latency on HMD users [16, 1] and to establish lower bounds for detectible latency [38, 39].

We used psychophysical experimental methods similar to those of Jerald et al. [39] to investigate how a more complex real world background changes the detectability of motion/misregistration of the tags and user ability to follow a guiding symbol. We tested detectability at three latency values: our best, a value close to the best available as of the start of the user study, and one in between. The choice of experimental latency values was informed by the detection thresholds reported in earlier research and in our own pilot studies, potentially values such as 1 ms (our target latency), 15 ms, and 50 ms. All tasks required that the user move around, stressing the tracking and rendering system. We first tested augmentation in a highly constrained condition: plain background and flat painted cuboid or domed objects. We then tested static augmentation with 2D tags with drop lines registered to real object locations and test dynamic augmentation by having the user following a moving symbol with a tracked tool. This environment provided minimal relative motion cues to the user who is looking for scene motion. Second, we tested in a more realistic environment. Considering a medical use case similar to the one depicted in FIG. 3, the user examined rendered tags affixed to locations in the abdominal cavity of our medical mannequin and followed a symbol over the organ models with a tool.

Each of the following references is incorporated herein by reference in its entirety:

[1] B. D. Adelstein, T. G. Lee, and S. R. Ellis. Head tracking latency in virtual environments: psychophysics and a model. In Proceedings of the Human Factors and Ergonomics Society Annual Meeting, volume 47, pages 2083-2087. SAGE Publications, 2003.

[2] Stylianos Asteriadis, Kostas Karpouzis, and Stefanos Kollias. Head pose estimation with one camera, in uncalibrated environments. In Proceedings of the 2010 workshop on Eye gaze in intelligent human machine interaction, EGIHMI '10, pages 55-62, New York, N.Y., USA, 2010. ACM.

[3] S. Baker, E. Bennett, Sing Bing Kang, and R. Szeliski. Removing rolling shutter wobble. In Computer Vision and Pattern Recognition (CVPR), 2010 IEEE Conference on, pages 2392-2399, June 2010.

[4] Peter N. Belhumeur and David J. Kriegman. What is the set of images of an object under all possible illumination conditions? Int. J. Comput. Vision, 28(3):245-260, July 1998.

[5] T. P. Caudell and D. W. Mizell. Augmented reality: an application of heads-up display technology to manual manufacturing processes. In System Sciences, 1992. Proceedings of the Twenty-Fifth Hawaii International Conference on, volume ii, pages 659-669 vol. 2, January 1992.

[6] B. Clipp, J. Lim, J. M. Frahm, and M. Pollefeys. Parallel, real-time visual slam. In Intelligent Robots and Systems (IROS), 2010 IEEE/RSJ International Conference on, pages 3961-3968. IEEE, 2010.

[7] Dorin Comaniciu and Peter Meer. Mean shift: A robust approach toward feature space analysis. IEEE Trans. Pattern Anal. Mach. Intell., 24(5):603-619, May 2002.

[8] Greg Coombe. Practical Surface Light Fields. Phd dissertation, 2007.

[9] Greg Coombe, Chad Hantak, Radek Grzeszczuk, and Anselmo Lastra. Online construction of surface light fields. In EGSR, 2005.

[10] Greg Coombe, Mark Harris, and Anselmo Lastra. Radiosity on graphics hardware. In Proceedings of Graphics Interface 2004.

[11] Greg Coombe and Anselmo Lastra. An incremental weighted least squares approach to surface lights fields. In GRAPP 2006, International Conference on Computer Graphics Theory and Applications, pages 84-91.

[12] A. J. Davison. Real-time simultaneous localisation and mapping with a single camera. In Computer Vision, 2003. Proceedings. Ninth IEEE International Conference on, pages 1403-1410. IEEE, 2003.

[13] A. J. Davison, I. D. Reid, N. D. Molton, and O. Stasse. Monoslam: Real-time single camera slam. Pattern Analysis and Machine Intelligence, IEEE Transactions on, 29(6):1052-1067, 2007.

[14] Michael Deering, Stephanie Winner, Bic Schediwy, Chris Duffy, and Neil Hunt. The triangle processor and normal vector shader: a VLSI system for high performance graphics. In Proceedings of the 15th annual conference on Computer graphics and interactive techniques, SIGGRAPH '88, pages 21-30, New York, N.Y., USA, 1988. ACM.

[15] Ahmed Elgammal. Learning to track: Conceptual manifold map for closed-form tracking. In Proceedings of the 2005 IEEE Computer Society Conference on Computer Vision and Pattern Recognition (CVPR'05)—Volume 1—Volume 01, CVPR '05, pages 724-730, Washington, D.C., USA, 2005. IEEE Computer Society.

[16] S. R. Ellis, A. Wolfram, and B. D. Adelstein. Three dimensional tracking in augmented environments: user performance trade-offs between system latency and update rate. In Proceedings of the Human Factors and Ergonomics Society annual meeting, volume 46, pages 2149-2153. SAGE Publications, 2002.

[17] Steven Feiner, Blair MacIntyre, Tobias Hollerer, and Anthony Webster. A touring machine: Prototyping 3d mobile augmented reality systems for exploring the urban environment. In Proceedings of the 1st IEEE International Symposium on Wearable Computers, ISWC '97, pages 74-, Washington, D.C., USA, 1997. IEEE Computer Society.

[18] Steven Feiner, Blair Macintyre, and Dor'ee Seligmann. Knowledge-based augmented reality. Commun. ACM, 36(7):53-62, July 1993.

[19] Martin A. Fischler and Robert C. Bolles. Random sample consensus: a paradigm for model fitting with applications to image analysis and automated cartography. Commun. ACM, 24(6):381-395, June 1981.

[20] P. Forsse and E. Ringaby. Rectifying rolling shutter video from hand-held devices. In Computer Vision and Pattern Recognition (CVPR), 2010 IEEE Conference on, pages 507-514, June 2010.

[21] E. R. Fossum. Cmos image sensors: electronic camera on a chip. In Electron Devices Meeting, 1995. IEDM '95., International, pages 17-25, December 1995.

[22] Henry Fuchs, Mark A. Livingston, Ramesh Raskar, Andrei State, Jessica R. Crawford, Paul Rademacher, Samuel H. Drake, and Anthony A. Meyer. Augmented reality visualization for laparoscopic surgery. In Proceedings of the First International Conference on Medical Image Computing and Computer-Assisted Intervention, pages 934-943. Springer-Verlag, 1998.

[23] J. L. Gabbard, D. Hix, J. E. Swan, et al. User-centered design and evaluation of virtual environments. Computer Graphics and Applications, IEEE, 19(6):51-59, 1999.

[24] Jinwei Gu, Y. Hitomi, T. Mitsunaga, and S. Nayar. Coded rolling shutter photography: Flexible space-time sampling. In Computational Photography (ICCP), 2010 IEEE International Conference on, pages 1-8, March 2010.

[25] G. D. Hager and P. N. Belhumeur. Efficient region tracking with parametric models of geometry and illumination. Pattern Analysis and Machine Intelligence, IEEE Transactions on, 20(10):1025-1039, October 1998.

[26] K. J. Hanna. Direct multi-resolution estimation of ego-motion and structure from motion. In Visual Motion, 1991., Proceedings of the IEEE Workshop on, pages 156-162, October 1991.

[27] Mark Harris. Real-Time Cloud Simulation and Rendering. PhD dissertation (available as technical report #tr03-040), 2003.

[28] Mark J. Harris, William V. Baxter, Thorsten Scheuermann, and Anselmo Lastra. Simulation of cloud dynamics on graphics hardware. In Proceedings of Graphics Hardware 2003.

[29] Mark J. Harris, Greg Coombe, Thorsten Scheuermann, and Anselmo Lastra. Physically-based visual simulation on graphics hardware. In SIGGRAPH/Eurographics Workshop on Graphics Hardware, 2002.

[30] David J. Heeger and Allan D. Jepson. Subspace methods for recovering rigid motion i: Algorithm and implementation. International Journal of Computer Vision, 7:95-117, 1992.

[31] Justin Hensley. Increasing Rendering Performance of Graphics Hardware. PhD dissertation, 2007.

[32] Justin Hensley, Anselmo Lastra, and Montek Singh. An area-and energy-efficient asynchronous booth multiplier for mobile devices. In Proc. Int. Conf. Computer Design (ICCD), pages 18-25, 2004.

[33] Justin Hensley, Anselmo Lastra, and Montek Singh. A scalable counterflow-pipelined asynchronous radix-4 booth multiplier. In Proceedings of the 11th IEEE International Symposium on Computer Design. IEEE Computer Society, 2005.

[34] Justin Hensley, Thorsten Scheuermann, Montek Singh, and Anselmo Lastra. Fast summed-area table generation and its applications. Proceedings of Eurographics 2005 and Computer Graphics Forum, 2005.

[35] Justin Hensley, Montek Singh, and Anselmo Lastra. A fast, energy-efficient z-comparator. In Proceedings of Graphics Hardware 2005, pages 41-44.

[36] Daniel Reiter Horn, Jeremy Sugerman, Mike Houston, and Pat Hanrahan. Interactive k-d tree GPU raytracing. In Proceedings of the 2007 symposium on Interactive 3D graphics and games, I3D '07, pages 167-174, New York, N.Y., USA, 2007. ACM.

[37] Marco C. Jacobs, Mark A. Livingston, and Andrei State. Managing latency in complex augmented reality systems. In Proceedings of the 1997 symposium on Interactive 3D graphics, I3D '97, pages 49-ff., New York, N.Y., USA, 1997. ACM.

[38] J. Jerald, T. Peck, F. Steinicke, and M. Whitton. Sensitivity to scene motion for phases of head yaws. In Proceedings of the 5th symposium on Applied perception in graphics and visualization, pages 155-162. ACM, 2008.

[39] J. Jerald, M. Whitton, and F. P. Brooks Jr. Scene-motion thresholds during head yaw for immersive virtual environments. ACM Transactions on Applied Perception (TAP), 9(1): 4, 2012.

[40] Michael Kelley, Kirk Gould, Brent Pease, Stephanie Winner, and Alex Yen. Hardware accelerated rendering of csg and transparency. In Proceedings of the 21st annual conference on Computer graphics and interactive techniques, SIGGRAPH '94, pages 177-184, New York, N.Y., USA, 1994. ACM.

[41] Peter Lincoln, Andrew Nashel, Adrian Ilie, Herman Towles, Gregory Welch, and Henry Fuchs. Multi-view lenticular display for group teleconferencing. In Proceedings of the 2nd International Conference on Immersive Telecommunications, IMMERSCOM '09, pages 22:1-22:8, ICST, Brussels, Belgium, Belgium, 2009. ICST (Institute for Computer Sciences, Social-Informatics and Telecommunications Engineering).

[42] Peter Lincoln, Greg Welch, Andrew Nashel, Adrian Ilie, Andrei State, and Henry Fuchs. Animatronic shader lamps avatars. In Proceedings of the 2009 8th IEEE International Symposium on Mixed and Augmented Reality, ISMAR '09, pages 27-33, Washington, D.C., USA, 2009. IEEE Computer Society.

[43] Andrew Maimone and Henry Fuchs. Encumbrance-free telepresence system with real-time 3d capture and display using commodity depth cameras. In Mixed and Augmented Reality (ISMAR), 2011 10th IEEE International Symposium on, October 2011.

[44] Andrew Maimone and Henry Fuchs. A first look at a telepresence system with room-sized real-time 3d capture and life-sized tracked display wall. In Artificial Reality and Telexistence (ICAT), 2011 21st International Conference on, November 2011.

[45] Andrew Maimone, Xubo Yang, Nate Dierk, Andrei State, Mingsong Dou, and Henry Fuchs. General-purpose telepresence with head-worn optical see-through displays and projector-based lighting. To appear in: IEEE Virtual Reality 2013, March 2013.

[46] William R. Mark, Leonard McMillan, and Gary Bishop. Post-rendering 3d warping. In Proceedings of the 1997 symposium on Interactive 3D graphics, I3D '97, pages 7-16, New York, N.Y., USA, 1997. ACM.

[47] U. Muehlmann, M. Ribo, P. Lang, and A. Pinz. A new high speed CMOS camera for real-time tracking applications. In Robotics and Automation, 2004. Proceedings. ICRA '04. 2004 IEEE International Conference on, volume 5, pages 5195-5200 Vol. 5, Apr.-1 May 2004.

[48] Hiroshi Murase and Shree K. Nayar. Visual learning and recognition of 3-d objects from appearance. Int. J. Comput. Vision, 14(1):5-24, January 1995.

[49] Junichi Nakamura. Image Sensors and Signal Processing for Digital Still Cameras. CRC Press, Inc., Boca Raton, Fla., USA, 2005.

[50] A. Nashel and H. Fuchs. Random hole display: A non-uniform barrier autostereoscopic display. In 3DTV Conference: The True Vision-Capture, Transmission and Display of 3D Video, 2009, pages 1-4, May 2009.

[51] U. Neumann and H. Fuchs. A vision of telepresence for medical consultations and other applications. In Proceedings of the Sixth International Symposium on Robotics Research, pages 565-571, October 1993.

[52] R. A. Newcombe and A. J. Davison. Live dense reconstruction with a single moving camera. In Computer Vision and Pattern Recognition (CVPR), 2010 IEEE Conference on, pages 1498-1505. IEEE, 2010.

[53] Haruo Niimi, Yoshirou Imai, Masayoshi Murakami, Shinji Tomita, and Hiroshi Hagiwara. A parallel processor system for three-dimensional color graphics. SIGGRAPH Comput. Graph., 18(3):67-76, January 1984.

[54] Marc Olano, Jon Cohen, Mark Mine, and Gary Bishop. Combatting rendering latency. In Proceedings of the 1995 symposium on Interactive 3D graphics, I3D '95, New York, N.Y., USA, 1995. ACM.

[55] Steven G. Parker, James Bigler, Andreas Dietrich, Heiko Friedrich, Jared Hoberock, David Luebke, David McAllister, Morgan McGuire, Keith Morley, Austin Robison, and Martin Stich. Optix: A general purpose ray tracing engine. ACM Transactions on Graphics, August 2010.

[56] M. Pollefeys, R. Koch, and L. V. Gool. Self-calibration and metric reconstruction inspite of varying and unknown intrinsic camera parameters. International Journal of Computer Vision, 32(1):7-25, 1999.

[57] M. Pollefeys, D. Nist'er, J. M. Frahm, A. Akbarzadeh, P. Mordohai, B. Clipp, C. Engels,

[58] D. Gallup, S. J. Kim, P. Merrell, et al. Detailed real-time urban 3d reconstruction from video. International Journal of Computer Vision, 78(2):143-167, 2008.

[59] M. Pollefeys, L. Van Gool, M. Vergauwen, F. Verbiest, K. Cornelis, J. Tops, and R. Koch. Visual modeling with a hand-held camera. International Journal of Computer Vision, 59(3):207-232, 2004.

[60] J. Pool, A. Lastra, and M. Singh. An energy model for graphics processing units. In Computer Design (ICCD), 2010 IEEE International Conference on, pages 409-416, October 2010.

[61] Jeff Pool, A. Lastra, and Montek Singh. Power-gated arithmetic circuits for energy-precision tradeoffs in mobile graphics processing units. Journal of Low-Power Electronics (JOLPE), 7(2):148-162, 2011.

[62] Jeff Pool, Anselmo Lastra, and Montek Singh. Energy-precision tradeoffs in mobile graphics processing units. In Proc. Int. Conf. Computer Design (ICCD), page 6067.

[63] Jeff Pool, Anselmo Lastra, and Montek Singh, Precision selection for energy-efficient pixel shaders. In Proc. High Performance Graphics. ACM, Aug. 5-7, 2011.

[64] Jeff Pool, Anselmo Lastra, and Montek Singh. Lossless compression of variable-precision floating-point buffers on GPUs. In Proc. Symposium on Interactive 3D Graphics (I3D), Mar. 9-11, 2012.

[65] R. Raguram, J. M. Frahm, and M. Pollefeys. A comparative analysis of RANSAC techniques leading to adaptive real-time random sample consensus. Computer Vision-ECCV 2008, pages 500-513, 2008.

[66] Jannick P. Rolland and Henry Fuchs. Optical versus video see-through head-mounted displays. In in Medical Visualization. Presence: Teleoperators and Virtual Environments, pages 287-309, 2000.

[67] A. State, K. P. Keller, and H. Fuchs. Simulation-based design and rapid prototyping of a parallax-free, orthoscopic video see-through head-mounted display. In Mixed and Augmented Reality, 2005. Proceedings. Fourth IEEE and ACM International Symposium on, pages 28-31, October 2005.

[68] Josh Steinhurst, Greg Coombe, and Anselmo Lastra. Reordering for cache conscious photon mapping. In Proceedings of Graphics Interface 2005.

[69] Joshua Steinhurst. Practical Photon Mapping in Hardware. PhD dissertation, 2007.

[70] Joshua Steinhurst, Greg Coombe, and Anselmo Lastra. Reducing photon mapping bandwidth by query reordering. IEEE Transactions on Visualization and Computer Graphics, 14(1):13-24, 2008.

[71] Joshua Steinhurst and Anselmo Lastra. Global importance sampling of glossy surfaces using the photon map. In IEEE Symposium on Interactive Ray Tracing, 2006.

[72] Gary Scott Watkins. A real time visible surface algorithm. PhD thesis, 1970. AAI7023061.

[73] M. C. Whitton and F. P. Brooks. Praeger Security International, 2008.

[74] H. Yang, M. Pollefeys, G. Welch, J. M. Frahm, and A. Hie. Differential camera tracking through linearizing the local appearance manifold. In Computer Vision and Pattern Recognition, 2007. CVPR'07. IEEE Conference on, pages 1-8. IEEE, 2007.

[75] Gu Ye, A. State, and H. Fuchs. A practical multi-viewer tabletop autostereoscopic display. In Mixed and Augmented Reality (ISMAR), 2010 9th IEEE International Symposium on, pages 147-156, October 2010.

It will be understood that various details of the subject matter described herein may be changed without departing from the scope of the subject matter described herein.

Furthermore, the foregoing description is for the purpose of illustration only, and not for the purpose of limitation.

What is claimed is:

1. A system for low latency stabilization of a head-worn display, the system comprising:
    a low latency pose tracker, including:
        at least one rolling-shutter camera that captures a 2D image by exposing each row of a frame at a later point in time than a previous row and outputs image data row by row;
        a tracking module for receiving image data row by row from the at least one camera and generating a local appearance manifold, using the local appearance manifold to track camera movements, and producing a pose estimate; and
    a rendering unit for:
        receiving pose estimates from the tracking module;
        using the pose estimates to predict a future pose at a time a pixel will be drawn, the pixel being a part of an augmented reality image to be displayed; and
        rendering the pixel just before the pixel is drawn.

2. The system of claim 1 wherein the at least one rolling-shutter camera comprises a plurality of rolling-shutter cameras and wherein the tracking module generates the local appearance manifold using image data received from the plurality of cameras.

3. The system of claim 2 wherein the plurality of rolling-shutter cameras are mounted in a known configuration of orientations and baseline distances between each camera.

4. The system of claim 1 wherein each of the at least one rolling-shutter camera stores data for a row into a row memory as soon as an exposure for the row is complete.

5. The system of claim 4 wherein the tracking module receives image data row by row by reading the data from the row memory.

6. The system of claim 1 wherein generating the local appearance manifold includes at least one of:
    linearizing the local appearance manifold;
    low-pass filtering the local appearance manifold; and
    Kalman filtering the local appearance manifold.

7. The system of claim 1 wherein producing the pose estimate includes at least one of:
    iteratively improving the pose estimate; and
    incorporating data provided from an onboard inertial measurement unit.

8. The system of claim 1 wherein rendering the pixel just before the pixel is drawn comprises determining which row of the augmented reality image will be displayed next and rendering pixels of that row prior to a time that row is displayed.

9. The system of claim 1 wherein rendering the pixel just before the pixel is drawn includes considering a predicted change of pose between a first time T1 that a row will be next displayed and a second time T2 that the row will be next displayed after time T1 and rendering the pixel in one of:
    an estimated location L1 of the pixel at the first time T1;
    an estimated location L2 of the pixel at the second time T2; and
    a location L3 between the estimated location L1 and the estimated location L2.

10. The system of claim 1 wherein the head-worn display is for displaying to a user the augmented reality image comprising a plurality of pixels rendered by the rendering unit.

11. The system of claim 10 wherein the head-worn display comprises an optical see-through display having a transparent body through which the user can see a real scene and upon which the augmented reality image is displayed so that the augmented reality image overlays the real scene from a point of view of the user.

12. The system of claim 11 wherein the transparent body comprises one of:
    a liquid crystal display (LCD);
    an organic light emitting diode (OLED) display; and
    a transparent surface upon which the augmented reality image is projected.

13. The system of claim 1 wherein at least some of the at least one rolling-shutter camera, the tracking module, the rendering unit, and components of the head-worn display are integrated into a semiconductor die.

14. A method for low latency stabilization of a head-worn display, the method comprising:
    generating a scan line by a rolling-shutter camera that captures a 2D image by exposing each scan line of a frame at a later point in time than a previous scan line and outputs image data scan line by scan line;
    using the scan line to generate a local appearance manifold;
    using the local appearance manifold to track camera movements;
    using the camera movements to produce pose estimates;
    using the pose estimates to predict a future pose at a time a pixel will be drawn, the pixel being a part of an augmented reality image to be displayed; and
    rendering the pixel just before the pixel is drawn.

15. The method of claim 14 wherein a plurality of scan lines are generated by a plurality of rolling-shutter cameras and wherein the plurality of scan lines are used to generate the local appearance manifold.

16. The method of claim 15 wherein the plurality of rolling-shutter cameras are mounted in a known configuration of orientations and baseline distances between each camera.

17. The method of claim 14 wherein the rolling-shutter camera stores data for the scan line into a scan line memory as soon as an exposure for the scan line is complete.

18. The method of claim 17 wherein using the scan line to generate the local appearance manifold includes using the data for the scan line from the scan line memory to generate the local appearance manifold.

19. The method of claim 14 wherein generating the local appearance manifold includes at least one of:
    linearizing the local appearance manifold;
    low-pass filtering the local appearance manifold; and
    Kalman filtering the local appearance manifold.

20. The method of claim 14 wherein producing the pose estimates includes at least one of: iteratively improving the pose estimates; and incorporating data provided from an onboard inertial measurement unit.

21. The method of claim 14 wherein rendering the pixel just before the pixel is drawn comprises determining which row of the augmented reality image will be displayed next and rendering pixels of that row prior to a time that row is displayed.

22. The method of claim 14 wherein rendering the pixel just before the pixel is drawn includes considering a predicted change of pose between a first time T1 that a row will be next displayed and a second time T2 that the row will be next displayed after time T1 and rendering the pixel in one of:
    an estimated location L1 of the pixel at the first time T1;
    an estimated location L2 of the pixel at the second time T2; and a location L3 between the estimated location L1 and the estimated location L2.

23. The method of claim 14 comprising using the head-worn display to display to a user the augmented reality image comprising a plurality of pixels rendered.

24. The method of claim 23 wherein the head-worn display comprises an optical see-through display having a transparent body through which the user can see a real scene and upon which the augmented reality image is displayed so that the augmented reality image overlays the real scene from a point of view of the user.

25. The method of claim 24 wherein displaying the augmented reality image on the transparent body comprises displaying the augmented reality image on one of:
   a liquid crystal display (LED);
   an organic light emitting diode (OLED) display; and
   a transparent surface upon which the augmented reality image is projected.

26. The method of claim 14 wherein at least some of the steps of generating a scan line, using the scan line to generate a local appearance manifold, using the local appearance manifold to track camera movements, using the camera movements to produce pose estimates, using the pose estimates to predict a future pose at a time a pixel will be drawn, and rendering the pixel just before the pixel is drawn are performed by circuits on a semiconductor die.

27. A non-transitory computer readable medium having stored thereon executable instructions that when executed by the processor of a computer control the computer to perform steps comprising:
   generating, by a plurality of rolling-shutter cameras that capture a 2D image by exposing each scan line of a frame at a later point in time than a previous scan line, wherein the each camera outputs image data scan line by scan line, wherein the plurality of cameras is mounted in a known configuration of orientations and baseline distances between each camera, a plurality of scan lines;
   using the plurality of scan lines to generate a local appearance manifold; using the local appearance manifold to track camera movements;
   using the camera movements to produce a pose estimates;
   using the pose estimates to predict a future pose at a time a pixel will be drawn, the pixel being a part of an augmented reality image to be displayed on an optical see-through head-worn display; and
   rendering the pixel just before the pixel is drawn.

* * * * *